US008289633B2

(12) United States Patent
Caldwell

(10) Patent No.: US 8,289,633 B2
(45) Date of Patent: Oct. 16, 2012

(54) UV-VIS-IR IMAGING OPTICAL SYSTEMS

(76) Inventor: James Brian Caldwell, Petersburg, VA (US)

(*) Notice: Subject to any disclaimer, the term of this patent is extended or adjusted under 35 U.S.C. 154(b) by 972 days.

(21) Appl. No.: 12/217,579

(22) Filed: Jul. 7, 2008

(65) Prior Publication Data
US 2009/0296201 A1 Dec. 3, 2009

Related U.S. Application Data

(60) Provisional application No. 60/961,329, filed on Jul. 20, 2007.

(51) Int. Cl.
G02B 9/12 (2006.01)
(52) U.S. Cl. .......................... 359/784; 359/642
(58) Field of Classification Search .................. 359/784, 359/642
See application file for complete search history.

(56) References Cited

U.S. PATENT DOCUMENTS

| | | | |
|---|---|---|---|
| 2,633,222 A | 12/1953 | Rosin et al. | |
| 3,348,896 A | 10/1967 | Betensky | |
| 3,486,805 A | 12/1969 | Kobayashi | |
| 3,490,825 A | 1/1970 | Takahashi | |
| 3,517,979 A | 6/1970 | Lowenthal | |
| 3,652,151 A | 3/1972 | Kawabe et al. | |
| 4,050,778 A | 9/1977 | Fleischman | |
| 4,206,972 A | 6/1980 | Dietzsch | |
| 4,387,970 A | 6/1983 | Brueggemann | |
| 4,681,407 A | 7/1987 | Mercado | |
| 4,702,569 A | 10/1987 | Mercado et al. | |
| 4,704,008 A | 11/1987 | Mercado | |
| 4,704,011 A | 11/1987 | Mercado | |
| 4,712,886 A | 12/1987 | Mercado | |
| 4,761,064 A | 8/1988 | Mercado | |
| 4,762,404 A | 8/1988 | Mercado | |
| 4,765,727 A | 8/1988 | Mercado | |
| 4,790,637 A | 12/1988 | Mercado | |
| 4,832,472 A | 5/1989 | Robb | |
| 4,929,071 A | 5/1990 | Mercado | |
| 5,000,548 A | 3/1991 | Mercado | |
| 5,020,889 A | 6/1991 | Mercado et al. | |
| 5,103,341 A | 4/1992 | Ulrich et al. | |
| 5,204,782 A | 4/1993 | Mercado et al. | |
| 5,210,646 A | 5/1993 | Mercado et al. | |
| 5,305,138 A | 4/1994 | Freedenberg | |
| 5,305,150 A | 4/1994 | Robb | |
| 5,699,202 A | 12/1997 | Yamamoto | |
| 5,754,345 A | 5/1998 | Yamamoto | |
| 5,798,874 A | 8/1998 | Yamamoto | |
| 5,914,823 A | 6/1999 | Yamamoto | |
| 5,920,432 A * | 7/1999 | Suenaga et al. | 359/656 |
| 6,208,459 B1 | 3/2001 | Coon et al. | |

* cited by examiner

Primary Examiner — James Greece
(74) Attorney, Agent, or Firm — Opticus IP Law PLLC

(57) ABSTRACT

Imaging optical systems having good transmission and that are well corrected over the full 315 nm-1100 nm ultraviolet-visible-infrared (UV-VIS-IR) wavelength band are disclosed. A wide variety of apochromatic and superachromatic design examples are presented. The imaging optical systems have a broad range of applications in fields where large-bandwidth imaging is called for, including but not limited to forensics, crime scene documentation, art conservation, forgery detection, medicine, scientific research, remote sensing, and fine art photography.

13 Claims, 26 Drawing Sheets

Zeiss Contax 25mm f/2.8

Zeiss Contax 60mm f/2.8

Zeiss Contax 300mm f/2.8

Zeiss Contax 100-300mm f/4-f/5.6 at 300mm f/5/6

UV-VIS-IR IMAGING OPTICAL SYSTEMS

CLAIM OF PRIORITY

This application claims priority under 35 USC §119(e) from U.S. Provisional Patent Application Ser. No. 60/961,329 filed on Jul. 20, 2007, which patent application is incorporated by reference herein.

FIELD OF THE INVENTION

The present invention relates to the field of broadband imaging optics, and more specifically relates to optical systems that have good transmission and are well corrected over a very wide spectrum ranging approximately from 315 nm in the ultraviolet through approximately 1100 nm in the infrared.

BACKGROUND ART

Recent advances in silicon-based image detectors have opened up possibilities for photography in a very wide waveband ranging from the deep UV (<200 nm) all the way to about 1100 nm in the near infrared. For many practical photographic purposes the UV portion of this waveband is limited to about 315 nm by atmospheric absorption of sunlight. The spectrum from 315 nm to 400 nm is commonly called the UVA spectrum. So, a very useful photographic spectrum will range from the onset of significant atmospheric transparency at about 315 nm all the way to the limit of silicon-based detector technology at about 1100 nm. A lens/camera system capable of high quality imagery over the 315 nm-1100 nm waveband would have a broad range of applications, including forensics, crime scene documentation, art conservation, forgery detection, medicine, scientific research, and fine art photography.

Of course, there are many imaging objectives in the prior art that are corrected for small portions of the 315 nm-1100 nm spectrum, but what is both lacking and needed are objectives offering both good transparency and good optical correction over the entire 315 nm-1100 nm spectrum.

In the prior art there are a number of examples of optical designs suited for a modest waveband in the near-UV. Typically these designs have ordinary two-wavelength achromatism, and their performance begins to degrade in the green or yellow portion of the visible spectrum. Examples include U.S. Pat. Nos. 2,663,222; 3,348,896; 3,517,979; 3,652,151; 4,050,778; and 4,387,970. These designs have unacceptable absorption at wavelengths below about 350 nm, and they also have extremely poor correction in the visible red and near infrared.

The prior art also includes examples of optical designs that use fused silica and CaF2 to achieve true apochromatic correction from the deep UV at about 250 nm through the visible waveband at about 650 nm. Examples include U.S. Pat. Nos. 3,486,805; 3,490,825; 5,103,341; 5,305,138; 5,699,202; 5,754,345; 5,798,874; and 5,914,823. The advantage of this type of design is that the optical transmission is extremely good, even at very short wavelengths down to about 190 nm. Unfortunately, the dispersions of fused silica and CaF2 become very similar for wavelengths longer than about 650 nm, so it is impossible to adequately correct chromatic aberration into the near infrared.

Also of interest are optical designs that are well corrected from the visible into the near infrared or even into the mid-infrared, but are not suited to use in the ultraviolet either because of a lack of optical correction or a lack of transparency or both. Examples include U.S. Pat. Nos. 4,206,972; 4,681,407; 4,704,011; 4,712,886; 4,832,472; 4,929,071 and 6,208,459.

Finally, there are optical designs that are corrected from the near-UV through the near-IR, but are not suited for use for the shorter wavelengths in the UVA waveband ranging from 315 nm up to about 350 nm. The reason for this shortcoming is either due to a lack of optical correction or a lack of transparency, or both. Examples include U.S. Pat. Nos. 4,702,569; 4,704,008; 4,761,064; 4,762,404; 4,765,727; 4,790,637; 5,000,548; 5,020,889; 5,204,782; 5,210,646 and 5,305,150. Even though some of the examples disclosed in these patents are color corrected at three, four, and even five wavelengths, none have adequate color correction below about 350 nm and many have extremely high absorption in the UV due to the glasses they use.

Accordingly, there is a need for an optical system that has both good optical correction and good optical transparency over the 315 nm through 1100 nm waveband.

SUMMARY OF THE INVENTION

The present invention is directed to optical systems that have good transmission and are well corrected over a broad spectrum ranging from about 315 nm through about 1100 nm. In order to achieve this, it is necessary to combine at least two different optical materials in the design, and to ensure that all of these materials have an optical transmission in a 10 mm thickness greater than 0.1 at a wavelength of 0.31 microns.

In conventional visible band photographic optics for the 35 mm (24 mm×36 mm) format, it is not necessary to reduce the axial secondary spectrum if the focal length is less than about 75 mm. Longer focal lengths—especially those longer than about 200 mm—benefit from a reduction in secondary spectrum. But even in these cases, it is rare to find designs that are truly apochromatic, i.e., in which three distinct wavelengths are brought to a common focus.

By contrast, photographic optics used in the extended waveband of 315 nm to 1100 nm have much more severe requirements regarding color correction. In lenses scaled for the 35 mm format, it has been found essential to achieve fully apochromatic correction even for focal lengths as short as 24 mm or less. For focal lengths greater than about 100 mm, it is desirable to achieve superachromatic correction wherein four distinct wavelengths are brought to a common focus.

Thus, in order for an optical system to be truly useful for the 315 nm-1100 nm spectrum, it must be exceptionally well corrected for chromatic aberrations, and in addition it must be very transparent to UVA radiation. These two simultaneous requirements demand that extreme care must be exercised when selecting optical materials.

The UV transparency constraint puts most high index glasses, especially the flint glasses with high dispersion, off-limits since these glasses have high UV absorption, especially in the 315 nm-320 nm region. Consider for example the Ohara glass PBM18Y, which has an index $n_d$ of 1.59551 and an Abbe number of 38.77. The Abbe number is defined as $(n_d-1)/(n_F-n_C)$, where $n_d$, $n_F$, and $n_C$ are the refractive index values at wavelengths of 587.5618 nm, 486.1327 nm, and 656.2725 nm, respectively. PMB18Y is one of the so-called "I-line" glasses that are specially designed and manufactured to give good UV transmission, especially down to the i-line wavelength of 365.0146 nm. Nonetheless, PBM18Y has an internal transmission of only about 22% through a 10 mm thick sample at a wavelength of 320 nm, and at 310 nm the transmission of PBM18Y drops to nearly zero. Other glasses with similar Abbe number that are not in the I-line class have essentially zero transmission in the 310 nm-320 nm range. Thus, it turns out that virtually all glasses having an Abbe number less than 40 are essentially useless for lenses operating in the 315 nm-1100 nm spectrum. The same is true for glasses having an index of refraction $n_d$ greater than 1.8. An exception would be the case where the lens elements are very small, such as in microscope objectives. Here, the small size of the lens elements means that they can be made very thin, thus improving their UV transmission.

The constraint on chromatic aberration correction means that optical systems for the 315 nm-1100 nm spectrum should be apochromatic or superachromatic, even for relatively short focal lengths. As a result, many of the glass types used must have anomalous partial dispersion in order to correct the secondary or tertiary spectrum. Suitable crown glasses for positive-powered lens elements in positive-powered groups or negative-powered elements in negative-powered groups include the fluor-crowns, such as Ohara S-FPL51 or Ohara S-FPL53, the fluor-phosphate crowns such as Schott N-PK51, and calcium fluoride (CaF2). Suitable "flint" glasses for negative-powered lens elements in positive-powered groups or positive-powered elements in negative-powered groups include the lanthanum crown glasses such as S-LAL18, S-LAL14 and S-LAL12, and a few of the barium crown glasses such as S-BAL42, S-BAL35, and S-BAL41. Although these glasses are not normally thought of as flint glass, they serve a similar function when combined with fluor crown, fluor-phosphate crown, or CaF2. Other useful glasses include S-FSL5, S-BSL7, and fused silica, although these are generally not as effective for chromatic aberration correction and are used to flatten the field and to correct other monochromatic aberrations instead. Superachromatic correction requires special care in glass selection, and the use of weak positive elements made of light flint I-line glass such as PBL6Y or PBL1Y has been found to be particularly effective.

Table 9 and 10, below, provide refractive index and transmission data on a number of glass types found to be useful in developing preferred embodiments of the invention.

By very careful choice of materials and design forms, it is possible to develop a wide range of high quality imaging systems for the 315 nm to 1100 nm waveband. The example embodiments described below are mainly intended for 35 mm format (24 mm×36 mm) photography, and include 24 mm and 35 mm apochromatic wide-angle designs, 60 mm apochromatic and 105 mm superachromatic macro designs, a 300 mm superachromatic telephoto, a 3:1 100 mm-300 mm superachromatic zoom lens, and a 1000 mm superachromatic telescope objective.

DETAILED DESCRIPTION OF THE INVENTION

The present invention relates to the field of broadband imaging optics. More specifically, the present invention relates to optical systems that have good transmission and are well corrected for a spectrum ranging approximately from 315 nm in the ultraviolet through 1100 nm in the infrared.

In the summary of the invention above, the descriptions below and in the claims, the phrase "well-corrected" in relation to the optical system of the present invention is understood in the art to mean that the collective effect of aberrations in the optical system are reduced to the point where the optical system is able to satisfactorily perform its particular imaging function. For example, in a photographic objective optical system according to the present invention, the Modulation Transfer Function (MTF) is an excellent and widely accepted means by which to judge the state of optical correction.

In particular, a photographic objective with a focal length greater than about 45 mm and an aperture between f/2.8 and f/5.6 intended for a format size of about 24 mm×36 mm is considered to be well-corrected if the MTF values at 10 cycles/mm and 40 cycles/mm have the following characteristics: 1) the MTF at 10 cycles/mm is approximately 90% or greater on-axis and is approximately 60% or greater at image heights less than or equal to 20 mm off-axis; and 2) the MTF at 40 cycles/mm is approximately 50% or greater on-axis and is approximately 30% or greater at image heights less than or equal to 20 mm off-axis.

For wide angle and zoom photographic objectives the criteria for "well-corrected" are relaxed somewhat, especially in the outer parts of the image field. Thus, a photographic objective with a focal length less than about 38 mm and an aperture between f/2.8 and f/5.6 intended for a format size of about 24 mm×36 mm is considered to be well-corrected if the MTF values at 10 cycles/mm and 40 cycles/mm have the following characteristics: 1) the MTF at 10 cycles/mm is approximately 80% or greater on-axis and is approximately 30% or greater at image heights less than or equal to 20 mm off-axis; and 2) the MTF at 40 cycles/mm is approximately 40% or greater on-axis and is approximately 10% or greater at image heights less than or equal to 20 mm off-axis.

Figure 9:
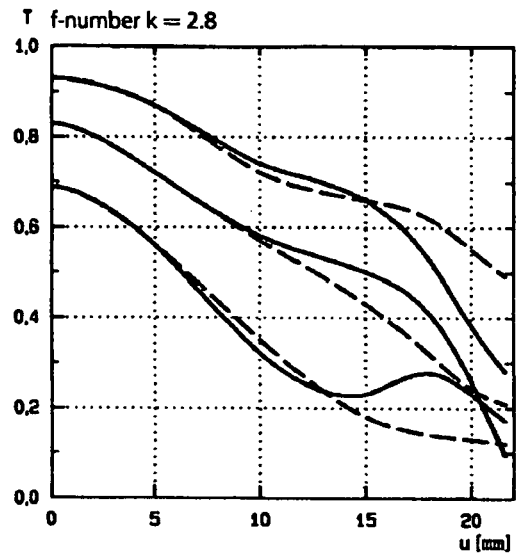
FIG. 9 are plots of MTF vs. Image Height for at spatial frequencies of 10 cycles/mm, 20 cycles/mm, and 40 cycles/mm for white light for four different commercial photographic lenses.
Figure 9:
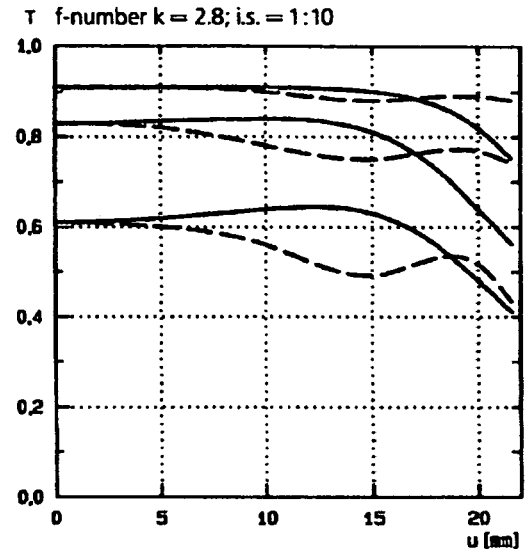
Figure 9:
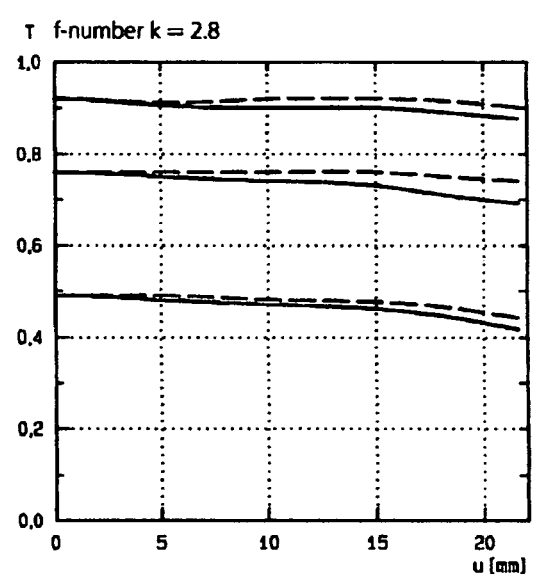
Figure 9:
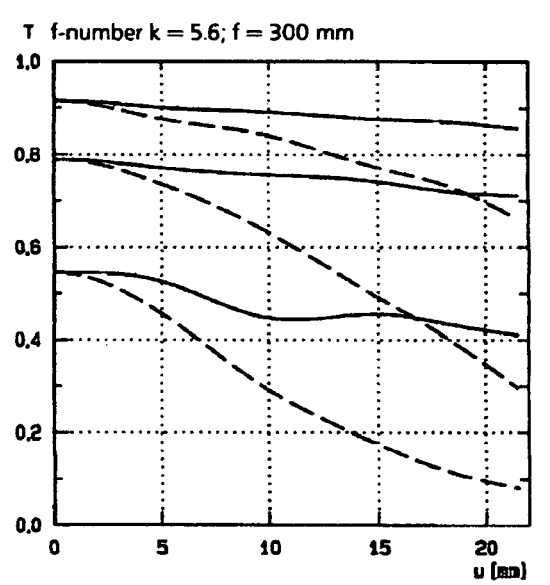

FIG. 9 illustrates the visible waveband MTF performance of several commercial Zeiss Contax photographic lenses intended for the 24 mm×36 mm format, including a 25 mm f/2.8 wide-angle lens, a 60 mm f/2.8 macro lens, a 300 mm f/2.8 telephoto lens and a 100 mm-300 mm f/4-f/5.6 zoom lens set to 300 mm. These lenses can be considered to be well-corrected for their intended use as photographic lenses, and thus serve as examples to verify that the statements made above regarding optical correction for the 24 mm×36 mm format are reasonable. The Zeiss MTF vs. image height data is provided for spatial frequencies of 10 cycles/mm, 20 cycles/mm and 40 cycles/mm, which are the same frequencies used to analyze Examples 1-6 in FIGS. 1d, 2d, 3d, 4d, 5d, 6d, and 6e. The Zeiss Contax MTF data was downloaded from their website at the following web address: http://www.zeiss-.com/C12567A8003B58B9/Contents-Frame/8401A54783ED1154C12570F90049667D Photographic objectives intended for formats larger than 24 mm×36 mm are still best judged by MTF, but the exact criteria for "well-corrected" are adjusted appropriately because the image area is significantly larger. A common large format size for extremely high quality digital photography is 72 mm×96 mm, which is the format size used by many digital scanning cameras such as Betterlight. The image circle needed to cover this format is at least 125 mm, and preferably at least 150 mm in order to allow camera movements. Large format digital scanning cameras are typically used for precision copying of flat artwork. Lenses intended for use with 72 mm×96 mm large format scanning cameras with a focal length greater than about 150 mm and an aperture between f/5.6 and f/11 are considered to be well-corrected if the MTF values at 7.5 cycles/mm and 30 cycles/mm have the following characteristics: 1) the MTF at 7.5 cycles/mm is approximately 85% or greater on-axis and is approximately 40% or greater at image heights less than or equal to 75 mm off-axis; and 2) the MTF at 30 cycles/mm is approximately 50% or greater on-axis and is approximately 10% or greater at image heights less than or equal to 75 mm off-axis.

Photographic lenses properly designed for the UV-VIS-IR waveband of 315 nm-1100 nm should be well-corrected according to the above criteria when the MIT is calculated over this whole waveband. In addition, such lenses should also be well corrected for the UV (315 nm-400 nm), VIS (400 nm-700 nm) and IR (700 nm-1100 nm) sub-wavebands when the MTF is calculated at a common focal plane. The reason for this is that in some applications the whole 315 nm-1100 nm waveband will be imaged at the same time, but in many applications the waveband will be split by the use of filters so that only discrete portions will be imaged. In one important scenario, the lens will be focused via a viewfinder in the visible spectrum, and then UV, VIS, and IR pass band filters will be placed in the optical path to photograph an object in the UV, VIS, and IR sub-wavebands. Clearly in this scenario it is important that there be little or no focus shift in the three different sub-wavebands.

In the case of telescope objectives MT is less useful and it is more appropriate to use peak-to-valley wavefront error (PTVWFE) as a criterion of optical correction. In particular, the on-axis PTVWFE of a well-corrected UV-VIS-IR telescope objective scaled to a focal length of 1000 mm and/or an entrance pupil diameter of about 100 mm should be less than ¼ wavelength throughout a major portion of the visible spectrum from 435 nm to 656 nm; it should be less than ⅛ wavelength at approximately 550 nm; it should be less than ½ wavelength in the extreme portions of the visible spectrum from 400 nm to 435 nm and from 656 nm to 700 nm; and it should be less than ½ wavelength outside the visible spectrum from 315 nm to 400 nm and from 700 nm to 1100 nm. All evaluations of PTVWFE must be done a common focal plane, i.e., without any focus shift as the wavelength is varied.

EXAMPLE 1

Figure 1A:
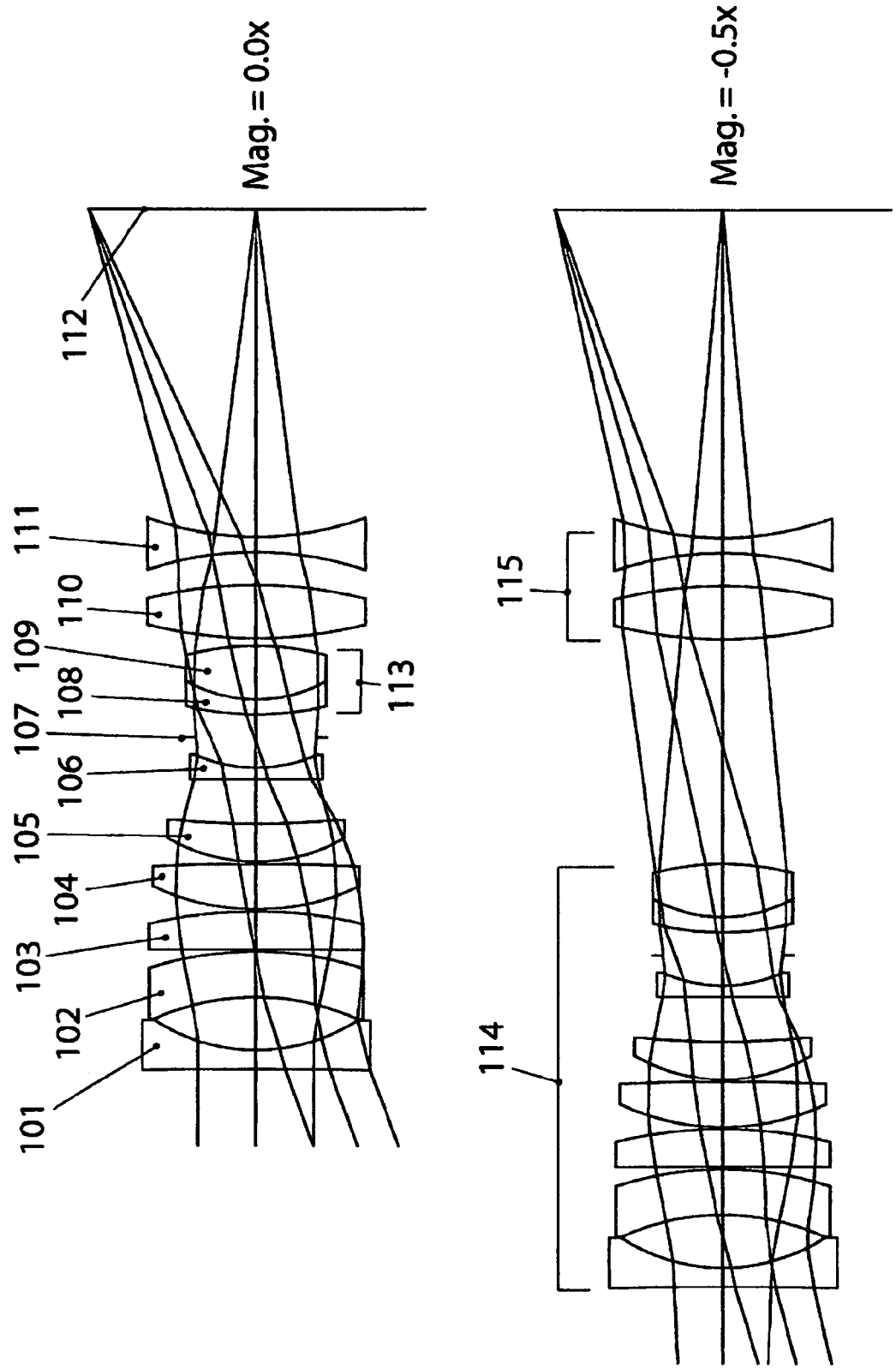
FIG. 1a is a layout drawing of an apochromatic macro focusing lens system showing magnification settings of 0.0× and −0.5× according to Example 1 of the present invention.

Example 1, which is a 60 mm focal length macro-focusing photographic objective for 35 mm format, is illustrated in FIG. 1a, which shows cross-sectional layouts at magnifications of 0 and −0.5×. Elements 101, 103, 104, 105, and 109 are made from CaF2; elements 102, 108, 110 and 111 are made from fused silica (SiO2); and element 106 is made from Ohara S-LAL18. Element 107 is the aperture stop and 112 is the image plane. This design has a very high internal transmission throughout the 315 nm-1100 nm waveband because there is just a single thin element (106) that is not CaF2 or fused silica. The addition of a negative-powered S-LAL18 element 106 enables the apochromatic color correction to be far superior in the near infrared to apochromats made solely from CaF2 and SiO2.

Example 1 is composed from just three different optical materials, however despite this simplicity it has the combination of both good optical correction and good transparency over the entire 315 nm-1100 nm waveband. Variation of coma during focusing is eliminated by fixing a weakly powered two-element rear group 115 at a constant distance from the image plane while moving a high-powered front group 114. Negative-powered elements 101 and 111, and the weak meniscus element 102, located near the front and rear of the lens act to flatten the field. This is of critical importance in a lens using so much low index material such as CaF2. Elements 108 and 109 are cemented together to form a doublet 113 in order to avoid tight tolerances and to minimize the number of air-glass interfaces that must be AR coated. This latter point is important because AR coatings for the very broad 315 nm-1100 nm waveband pose special challenges.

Figure 1C:
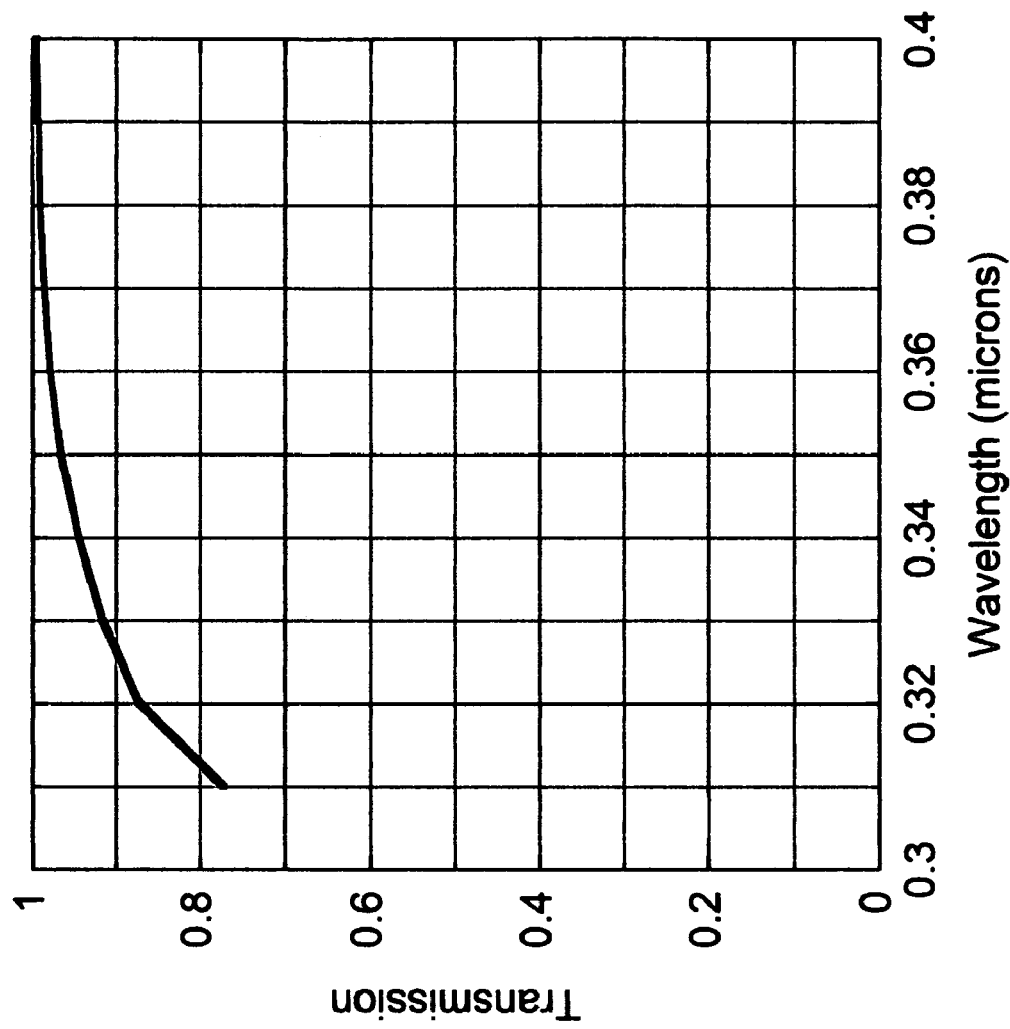
FIG. 1c is a plot of internal transmission vs. wavelength for an apochromatic macro-focusing lens according to Example 1 of the present invention.
Figure 1B:
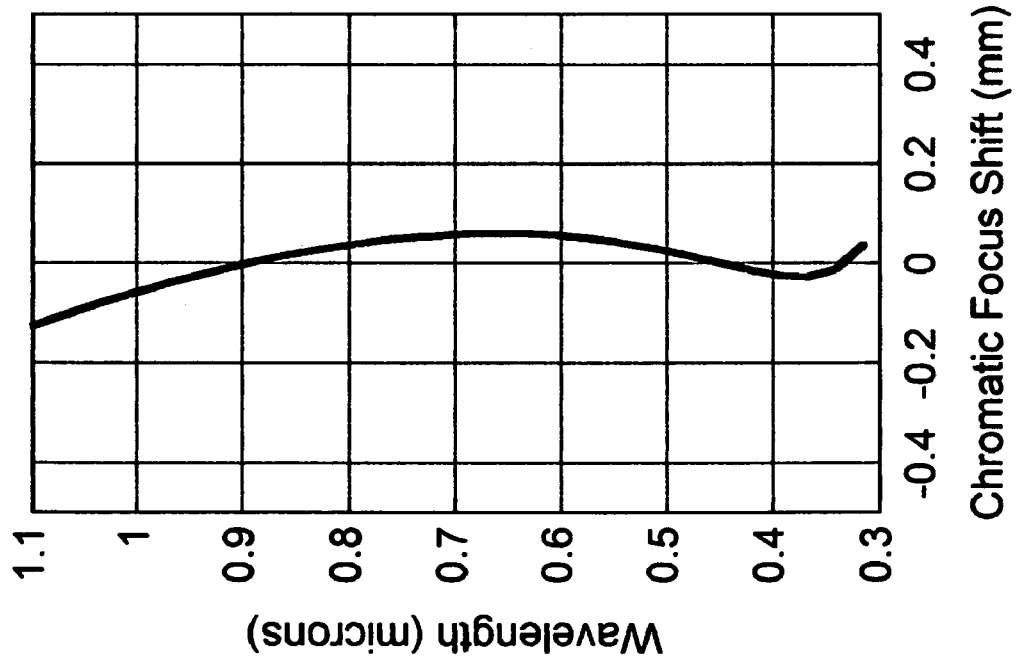
FIG. 1b is a plot of chromatic focal shift vs. wavelength for an apochromatic macro-focusing lens at a magnification setting of 0.0× according to Example 1 of the present invention.

The focal length of Example 1 is 60 mm, the aperture is f/4, the image format is 24 mm×36 mm (43.26 mm diagonal), the diagonal field of view (FOV) is 39.6 degrees, and the total transmission of the on-axis ray bundle at 315 nm is 82.8%. Chromatic focus shift vs. wavelength at a 0.7 pupil zone is illustrated in FIG. 1b, and transmission vs. wavelength is illustrated in FIG. 1c. The fact that there are three crossings in FIG. 1b indicates that this design is a true apochromat.

Figure 1D:
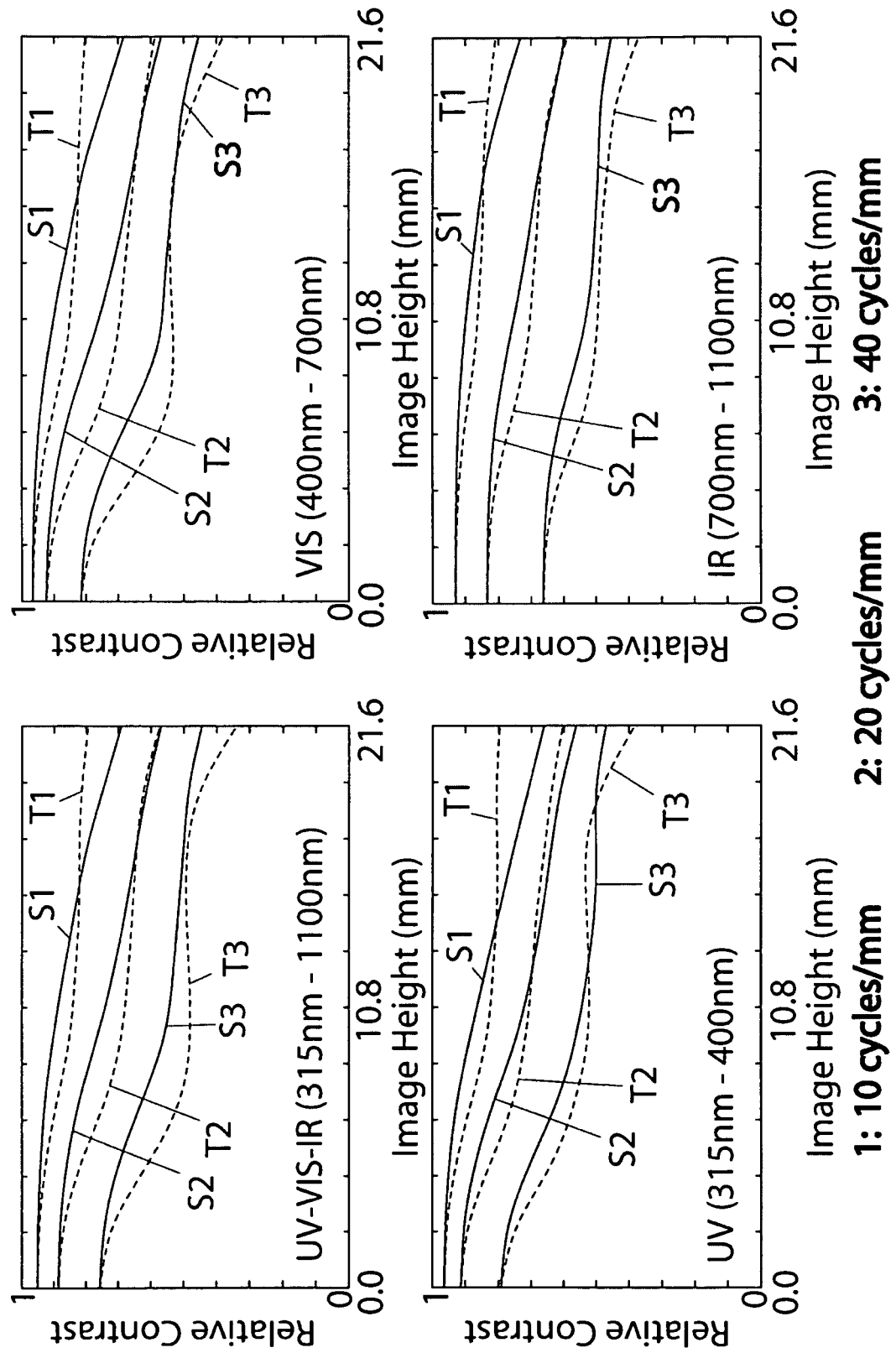
FIG. 1d are plots of MTF vs. Image Height at 10 cycles/mm, 20 cycles/mm and 40 cycles/mm for the UV-VIS-IR waveband of 315 nm-1100 nm, the UV waveband of 315 nm-400 nm, the VIS waveband of 400 nm-700 nm, and the IR waveband of 700 nm-1100 nm according to Example 1 of the present invention.

FIG. 1d illustrates the MTF of Example 1 wide open at f/4 for an object located at infinity. The four different plots are calculated for the full UV-VIS-IR waveband of 315 nm-1100 nm, the UV sub-waveband of 315 nm-400 nm, the VIS sub-waveband of 400 nm-700 nm, and the IR sub-waveband of 700 nm-1100 nm, respectively. FIG. 1d clearly demonstrates that Example 1 is well corrected over each of the UV, VIS, and IR sub-wavebands as well as for the full UV-VIS-IR waveband.

EXAMPLE 2

Figure 2A:
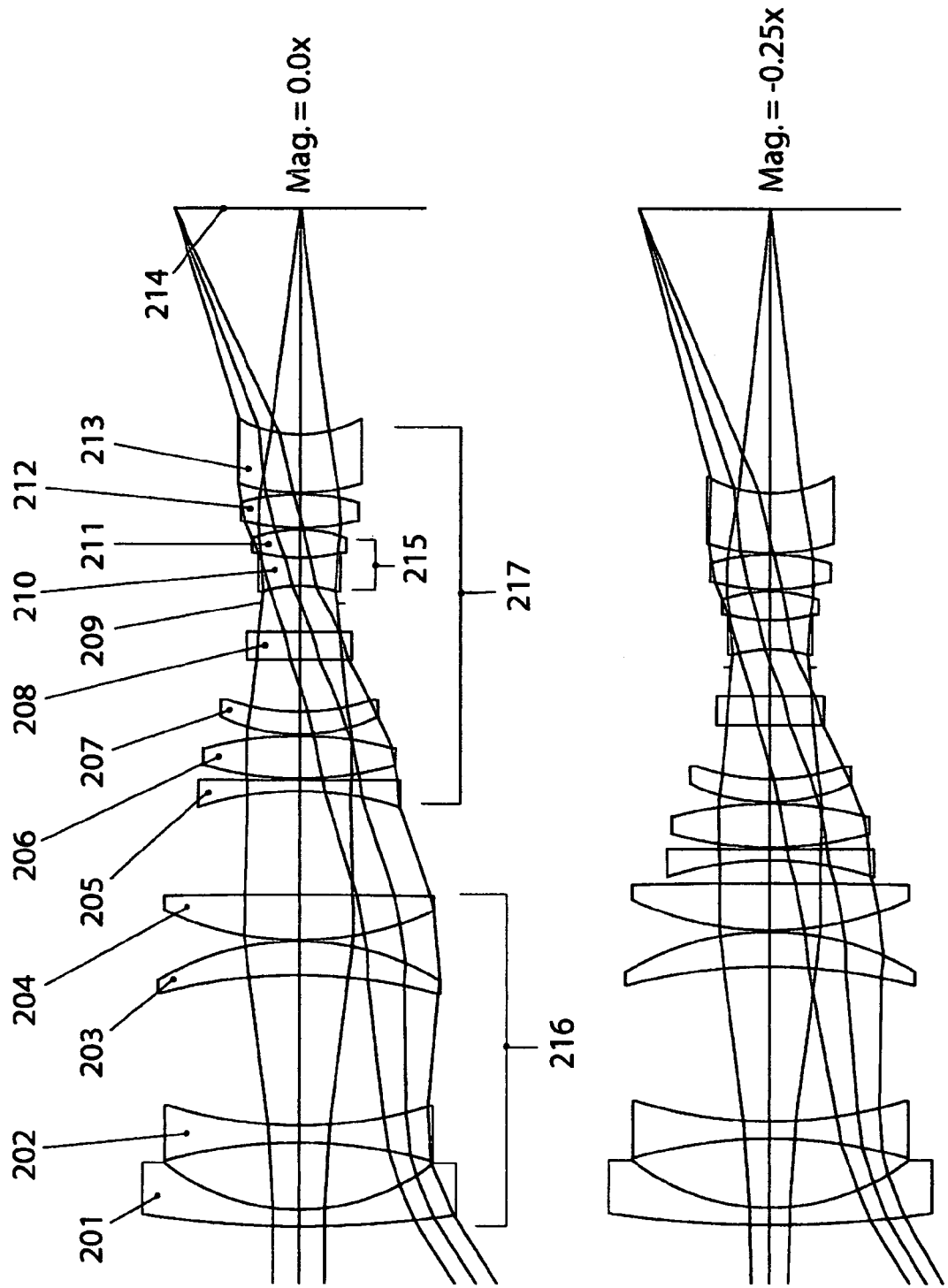
FIG. 2a is a layout drawing of an apochromatic inverted telephoto lens system showing magnification settings of 0.0× and −0.25× according to Example 2 of the present invention.

Example 2, which is a 35 mm focal length wide-angle photographic objective for 35 mm format, is illustrated in FIG. 2a, which shows cross-sectional layouts at magnifications of 0 and −0.25×. Elements 206, 211 and 212 are made from CaF2; elements 202 and 204 are made from Ohara S-FPL51; elements 203, 205, 207 and 213 are made from Ohara S-FSL5; element 201 is made from Ohara S-BAL42; and element 210 is made from Ohara S-LAL14. Element 209 is the aperture stop and 214 is the image plane. In this design, S-FPL51 has been used as a substitute for CaF2 in the larger elements 202 and 204 in order to reduce costs. However, this reduces the transmission at 315 nm. S-LAL14 and S-BAL42 are used as matching flints. Separating the design into two independently moving groups 216 and 217 eliminates variation of lateral chromatic aberration and astigmatism during focusing.

Element 208 is a 5 mm thick filter with plane parallel surfaces made of S-BSL7. It is anticipated that in ordinary use a lens corrected over the 315 nm to 1100 nm waveband will be used with a filter. A typical scenario involves the following steps: first the lens is focused in the visible waveband with a visible pass band filter in place; next a visible band photograph is taken with the visible pass band filter in place; next a series of photographs are taken in the UV and IR portions of the spectrum after removing the visible pass band filter and attaching appropriate UV or IR pass band filters. A widely accepted practice for attaching a filter to a lens is to screw it onto a threaded outer portion of the lens barrel. However, in the cases of wide-angle lenses in which the chief ray height is large at the front element and large aperture lenses in which the marginal ray height is large at the front element the required diameter of the filter becomes very large. In such cases it may be advantageous to adopt a different filter attachment approach in which the filter is screwed onto a mounting flange located near the back of the lens, or is inserted into a slot opening in the lens barrel, or is swung into place by rotating an internal filter wheel. The latter approach of using an internal filter wheel is particularly desirable because it allows for a very rapid changing of filters and it keeps the filters clean. Example 2 is well suited to this approach because the filter is located near the aperture stop and its diameter is thus very small relative to what it would have to be if it were located in front of the lens. For ordinary lenses in which the filter is located in front it is not necessary to include the filter in the optical design because the filter has no effect on the aberrations for a distant object. For ordinary close focusing magnification ratios ranging down to 1:1 the effect of the filter is very small and can be neglected. However, if the filter is located between the front vertex of the lens and the image plane it must be included in the optical prescription because then it will have a noticeable effect on the optical aberrations.

Although Example 2 is a reversed telephoto type design with a natural separation of positive and negative power, this was not sufficient to flatten the field. The addition of meniscus element 213 with a strong concave surface facing the image plane was found to be very effective in correcting residual field curvature. Elements 210 and 211 are cemented together to form a doublet 215 in order to avoid tight tolerances and to minimize the number of AR coated surfaces.

Figure 2C:
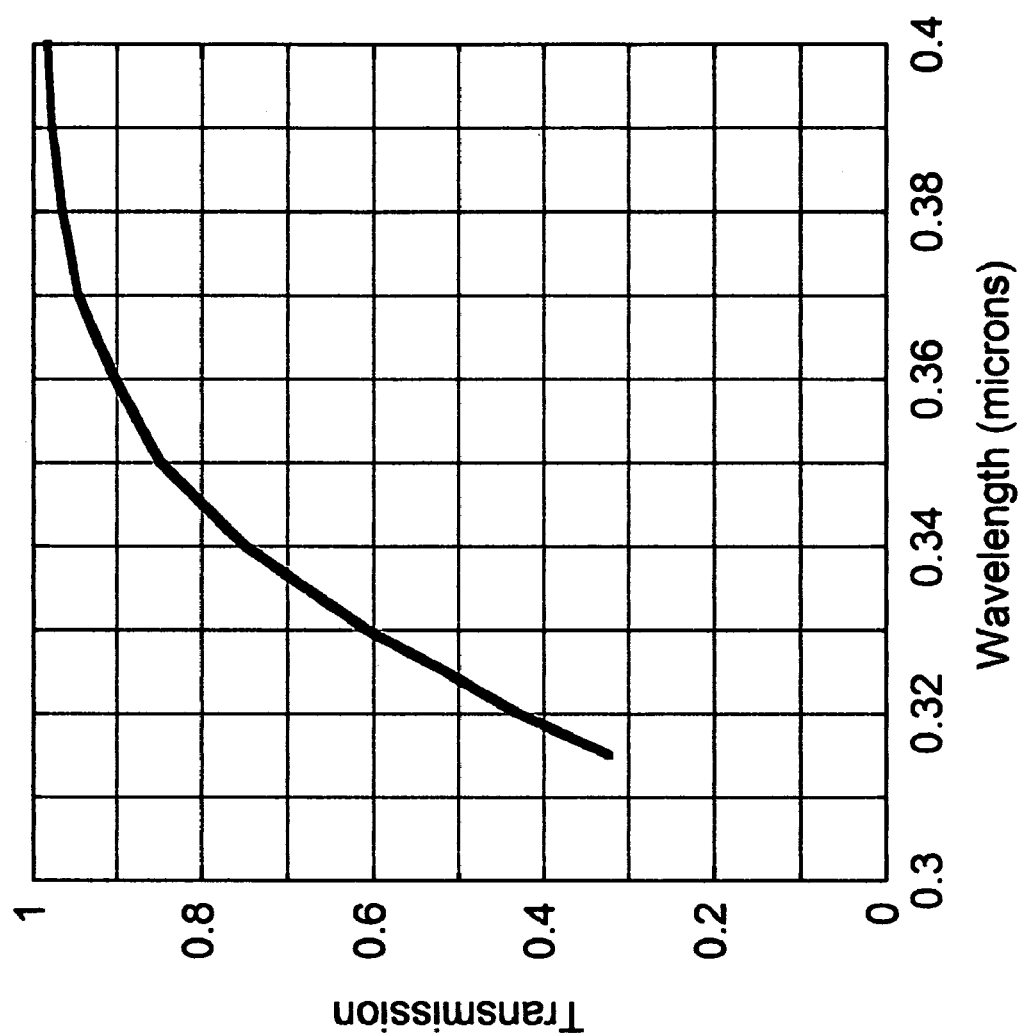
FIG. 2c is a plot of internal transmission vs. wavelength for an apochromatic inverted telephoto lens system according to Example 2 of the present invention.
Figure 2B:
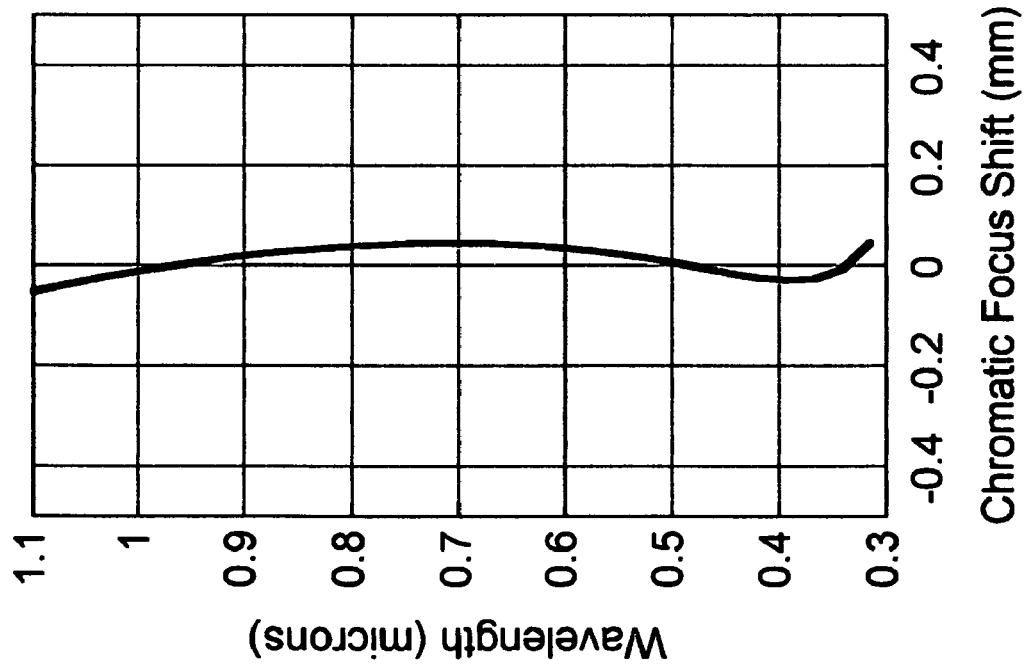
FIG. 2b is a plot of chromatic focal shift vs. wavelength for an apochromatic inverted telephoto lens system at a magnification setting of 0.0× according to Example 2 of the present invention.

The focal length of Example 2 is 35 mm, the aperture is f/4, the image format is 24 mm×36 mm (43.26 mm diagonal), the diagonal field of view (FOV) is 63.4 degrees, and the total transmission of the on-axis ray bundle at 315 nm is 32.2%. Chromatic focus shift vs. wavelength at a 0.5 pupil zone is illustrated in FIG. 2b, and transmission vs. wavelength is illustrated in FIG. 2c. The fact that there are three crossings in FIG. 2b indicates that this design is a true apochromat.

Figure 2D:
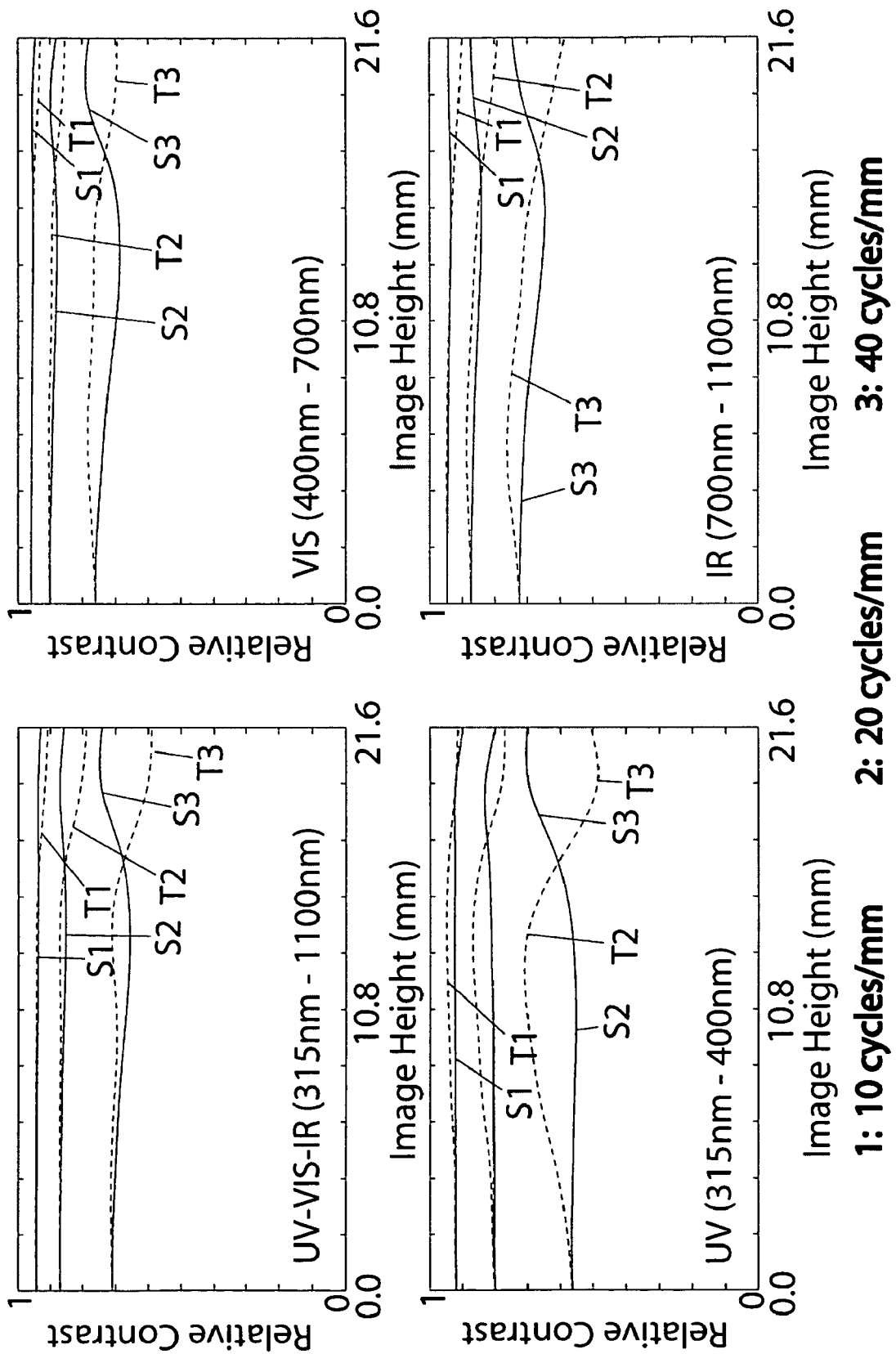
FIG. 2d are plots of vs. Image Height at 10 cycles/mm, 20 cycles/mm and 40 cycles/mm for the UV-VIS-IR waveband of 315 nm-100 nm, the UV waveband of 315 nm-400 nm, the VIS waveband of 400 nm-700 nm, and the IR waveband of 700 nm-100 nm according to Example 2 of the present invention.

FIG. 2d illustrates the MTF of Example 2 wide open at f/4 for an object located at infinity. The four different plots are calculated for the full UV-VIS-IR waveband of 315 nm-1100 nm, the UV sub-waveband of 315 nm-400 nm, the VIS sub-waveband of 400 nm-700 nm, and the IR sub-waveband of 700 nm-1100 nm, respectively. FIG. 2d clearly demonstrates that Example 2 is well corrected over each of the UV, VIS, and IR sub-wavebands as well as for the full UV-VIS-IR waveband. The level of correction is in fact unusually high for a wide-angle photographic objective.

EXAMPLE 3

Figure 3A:
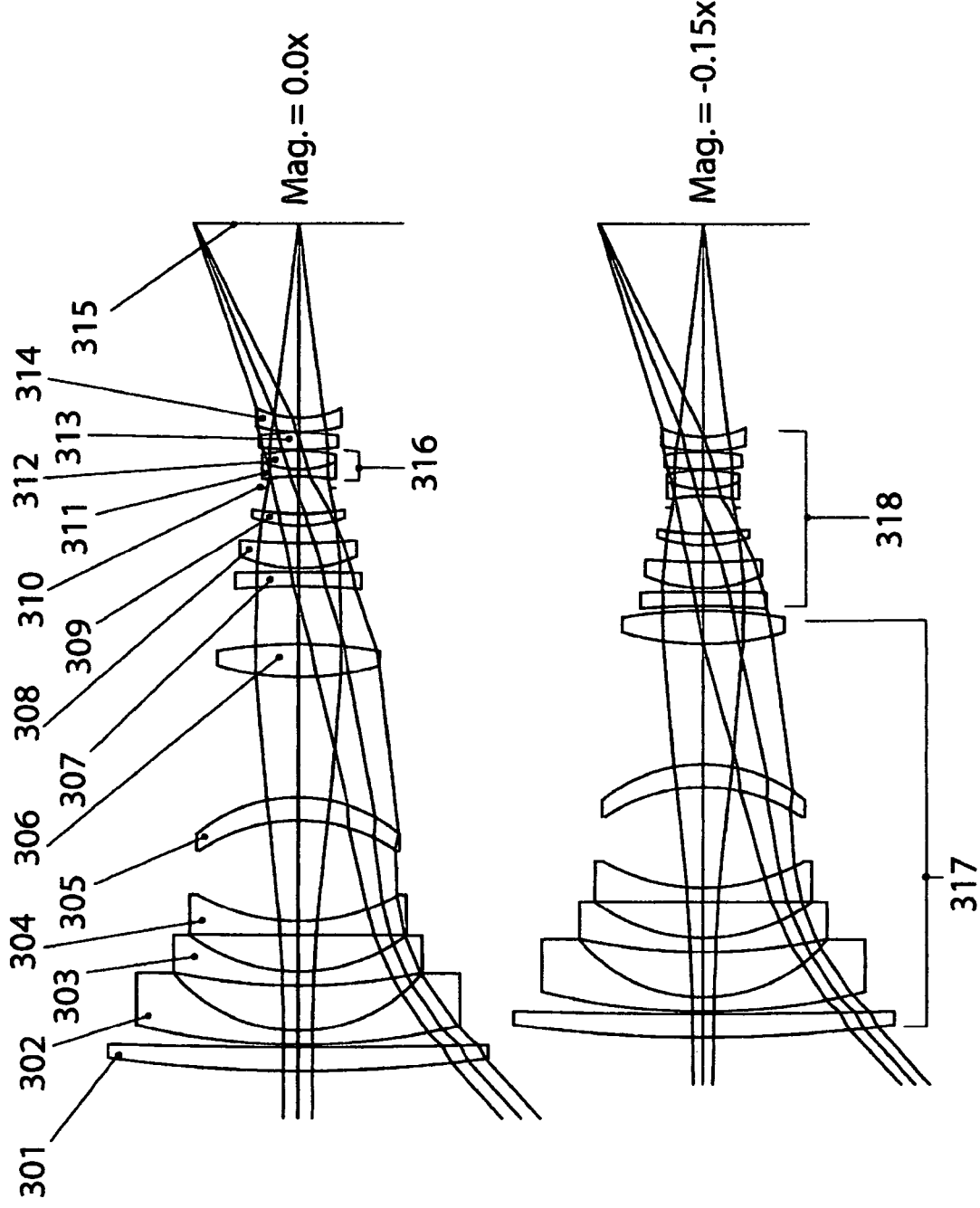
FIG. 3a is a layout drawing of an apochromatic inverted telephoto lens system showing magnification settings of 0.0× and −0.15× according to Example 3 of the present invention.

Example 3, which is a 24 mm focal length wide-angle photographic objective for 35 mm format, is illustrated in FIG. 3a, which shows cross-sectional layouts at magnifications of 0 and −0.15×. Elements 301, 305 and 314 are made from fused silica (SiO2); elements 303, 304, 306, 308, 312 and 313 are made from CaF2; element 302 is made from Ohara S-FPL51Y; element 309 is made from Ohara S-FPL51; element 307 is made from Ohara S-BAL42; and element 311 is made from Ohara S-LAL18. Element 310 is the aperture stop and 315 is the image plane. Example 3 bears a resemblance to Example 2, but in Example 3 there is more extensive use of CaF2, SiO2 and S-FPL51Y. As a result, Example 3 has a significantly higher transmission at 315 nm than Example 2. Apochromatic performance has been achieved by pairing CaF2 and S-FPL51Y with S-LAL18 and S-BAL42. Separating the design into two independently moving groups 317 and 318 eliminates variation of lateral chromatic aberration and astigmatism during focusing.

Similar to Example 2, the separation of positive and negative power inherent in the reversed telephoto design form was found insufficient to flatten the field, and residual field curvature is eliminated with meniscus element 314 with a strong concave surface facing the image plane. Elements 311 and 312 are cemented together to form a doublet 316 in order to avoid tight tolerances and minimize the number of AR coated surfaces.

Figure 3C:
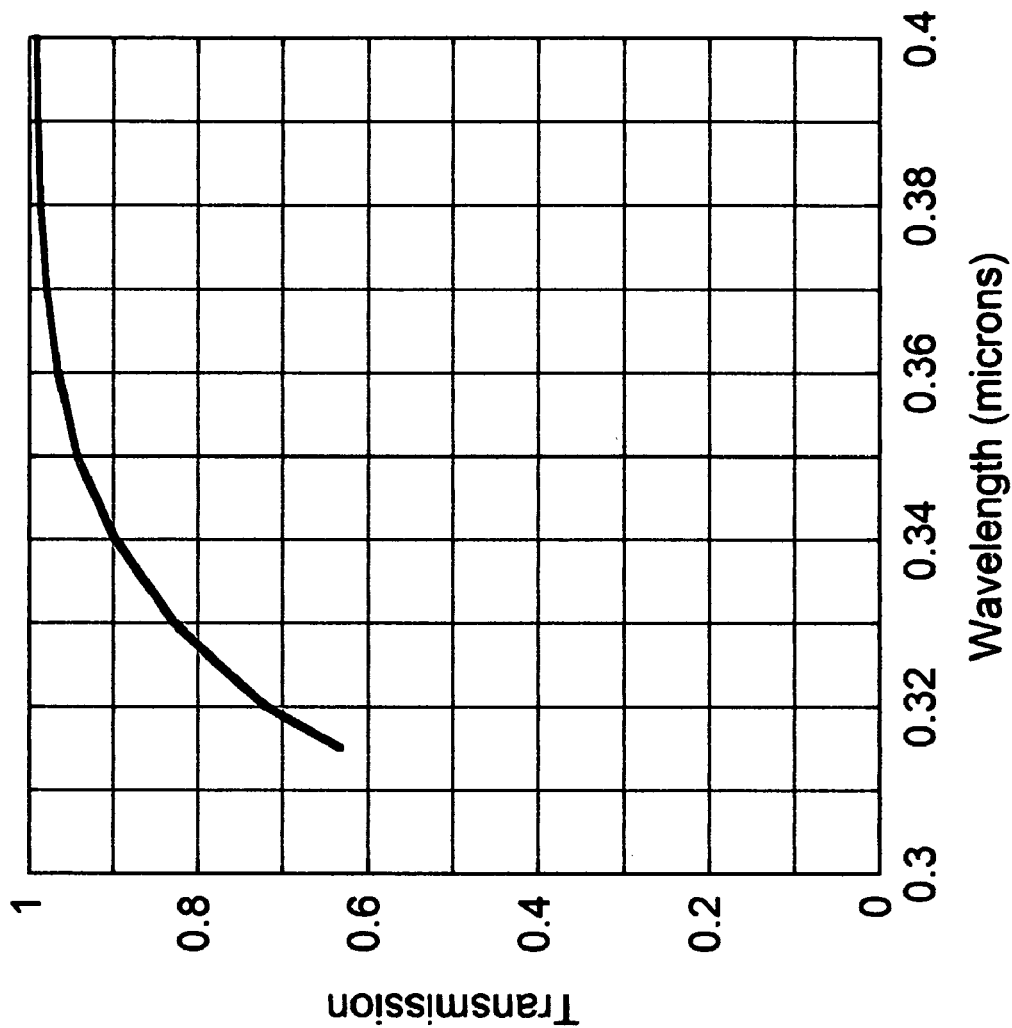
FIG. 3c is a plot of internal transmission vs. wavelength for an apochromatic inverted telephoto lens system according to Example 3 of the present invention.
Figure 3B:
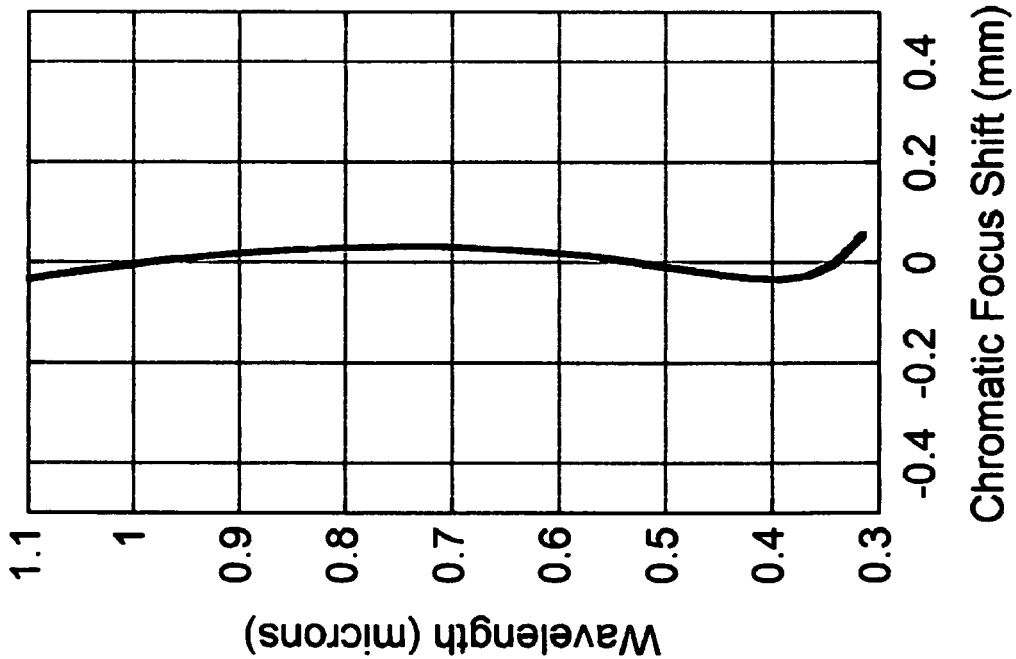
FIG. 3b is a plot of chromatic focal shift vs. wavelength for an apochromatic inverted telephoto lens system at a magnification setting of 0.0× according to Example 3 of the present invention.

The focal length of Example 3 is 24 mm, the aperture is f/4, the image format is 24 mm×36 mm (43.26 mm diagonal), the diagonal field of view (FOV) is 84.1 degrees, and the total transmission of the on-axis ray bundle at 315 nm is 63.2%. Chromatic focus shift vs. wavelength at a 0.67 pupil zone is illustrated in FIG. 3b, and transmission vs. wavelength is illustrated in FIG. 3c. The fact that there are three crossings in FIG. 3b indicates that this design is a true apochromat.

Figure 3D:
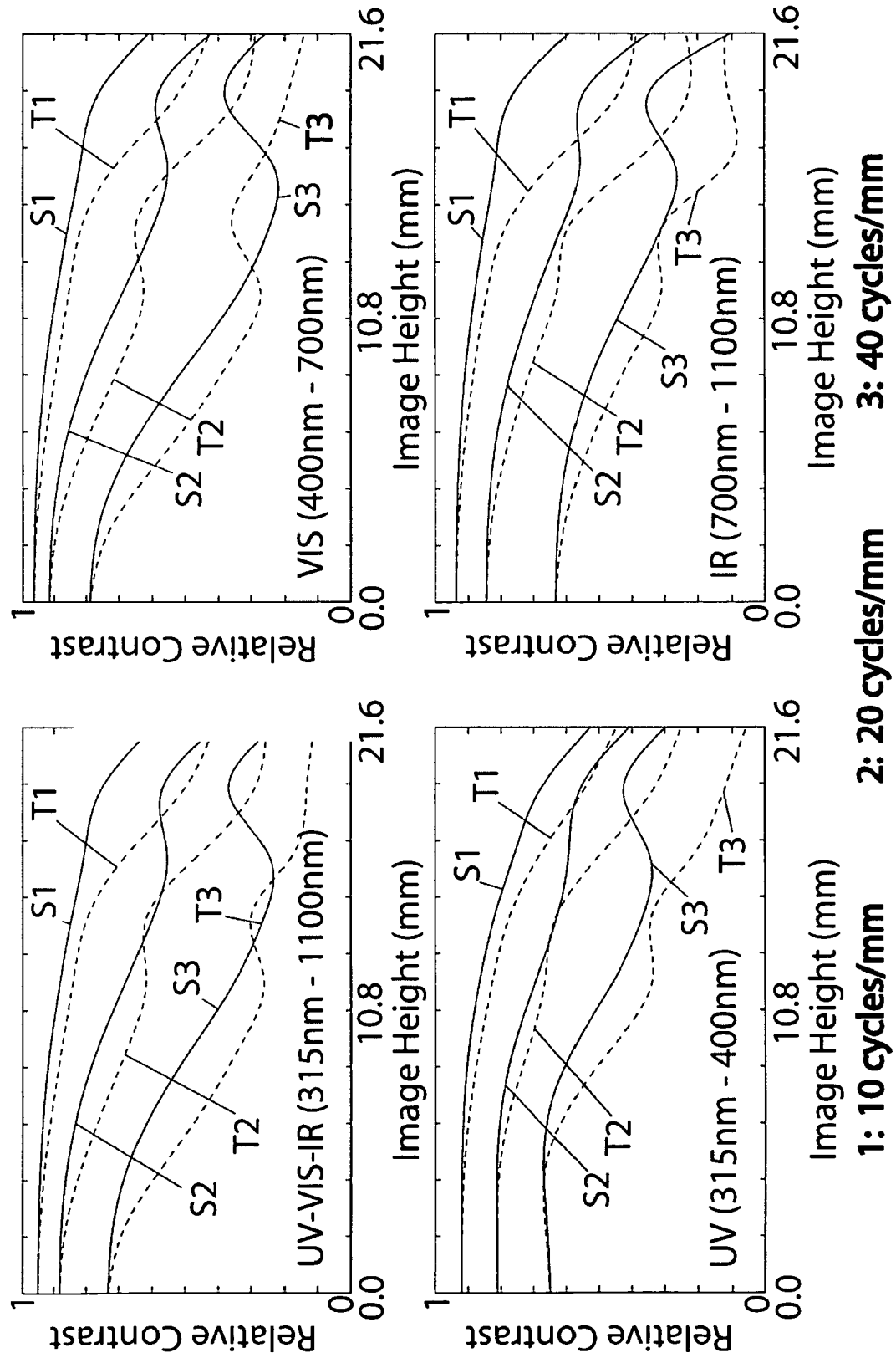
FIG. 3d are plots of MTF vs. Image Height at 10 cycles/mm, 20 cycles/mm and 40 cycles/mm for the UV-VIS-IR waveband of 315 nm-1100 nm, the UV waveband of 315 nm-400 nm, the VIS waveband of 400 nm-700 nm, and the IR waveband of 700 nm-100 nm according to Example 3 of the present invention.

FIG. 3d illustrates the MTF of Example 3 wide open at f/4 for an object located at infinity. The four different plots are calculated for the full UV-VIS-IR waveband of 315 nm-1100 nm, the UV sub-waveband of 315 nm-400 nm, the VIS sub-waveband of 400 nm-700 nm, and the IR sub-waveband of 700 nm-1100 nm, respectively. FIG. 3d demonstrates that Example 3 is well corrected over each of the UV, VIS, and IR sub-wavebands as well as for the full UV-VIS-IR waveband.

EXAMPLE 4

Figure 4A:
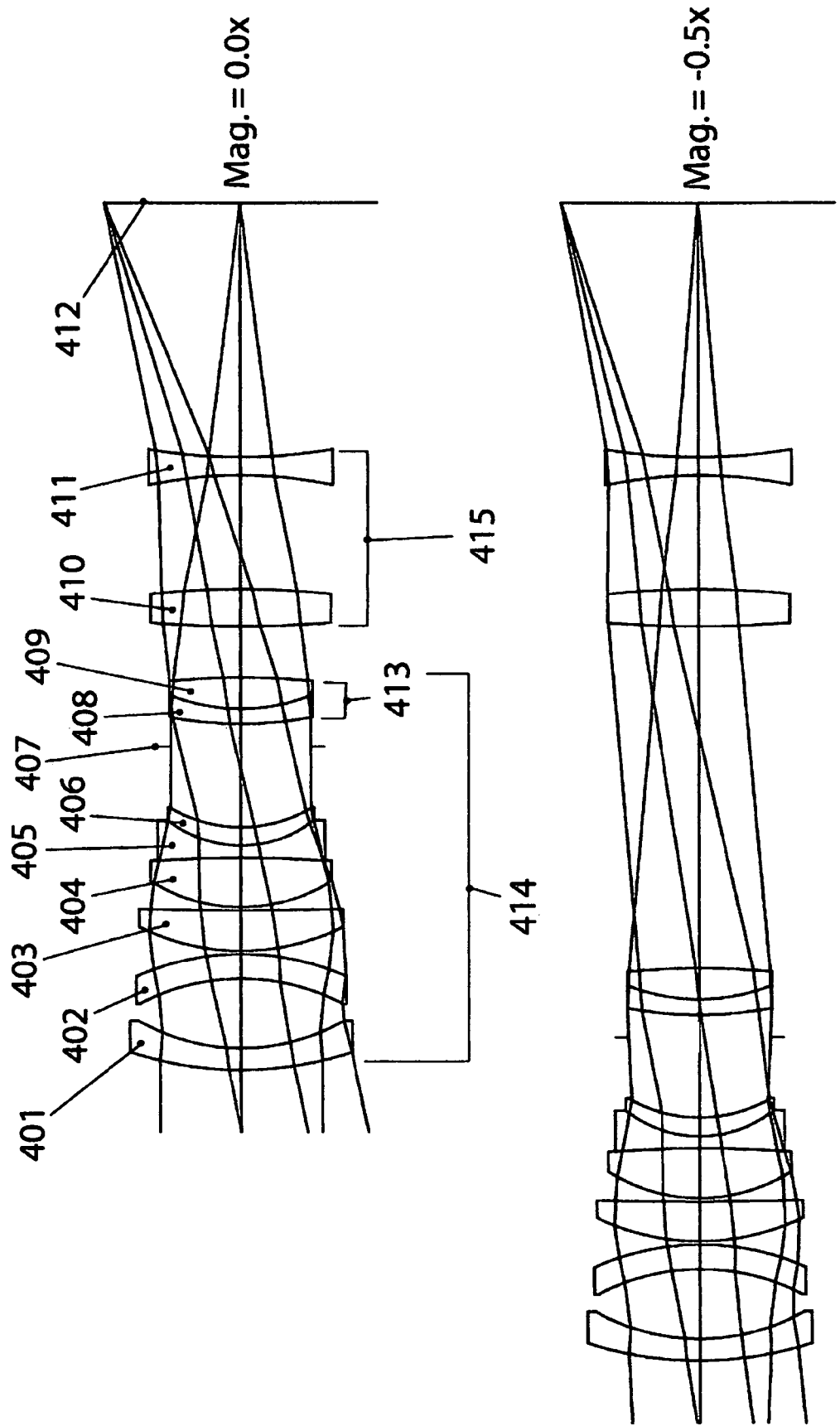
FIG. 4a is a layout drawing of a superachromatic macro focusing lens system showing magnification settings of 0.0× and −0.5× according to Example 4 of the present invention.

Example 4, which is a 105 mm focal length macro-focusing photographic objective for 35 mm format, is illustrated in FIG. 4a, which shows cross-sectional layouts at magnifications of 0 and −0.5×. Elements 401, 410 and 411 are made from Ohara S-FSL5; elements 402 and 406 are made from Ohara PBL6Y; elements 403 and 409 are made from Ohara S-FPL51Y; element 404 is made from Ohara S-FPL53; and elements 405 and 408 are made from Ohara S-BAL42. Element 407 is the aperture stop and 412 is the image plane. It is notable that none of the elements are made from CaF2 or fused silica, but despite this the design has superachromatic color correction with very low tertiary spectrum, and also has very respectable transmission down to 315 nm. In Example 4, S-FPL53 and S-FPL51Y effectively substitute for CaF2 and S-BAL42 acts as a matching flint. Weak elements made from PBL6Y are the key to achieving superachromatic color correction.

Variation of coma during focusing is eliminated by fixing a weakly powered two-element rear group 415 at a constant distance from the image plane while moving a high-powered front group 414. Negative-powered elements 401 and 411, and the weak meniscus element 402, located near the front and rear of the lens act to flatten the field. This is of critical importance in a lens made from materials having a low refractive index. Elements 408 and 409 are cemented together to form a doublet 413, and elements 403, 404, and 405 are cemented together to form a triplet in order to avoid tight tolerances and minimize the number of surfaces requiring an AR coating.

Figure 4C:
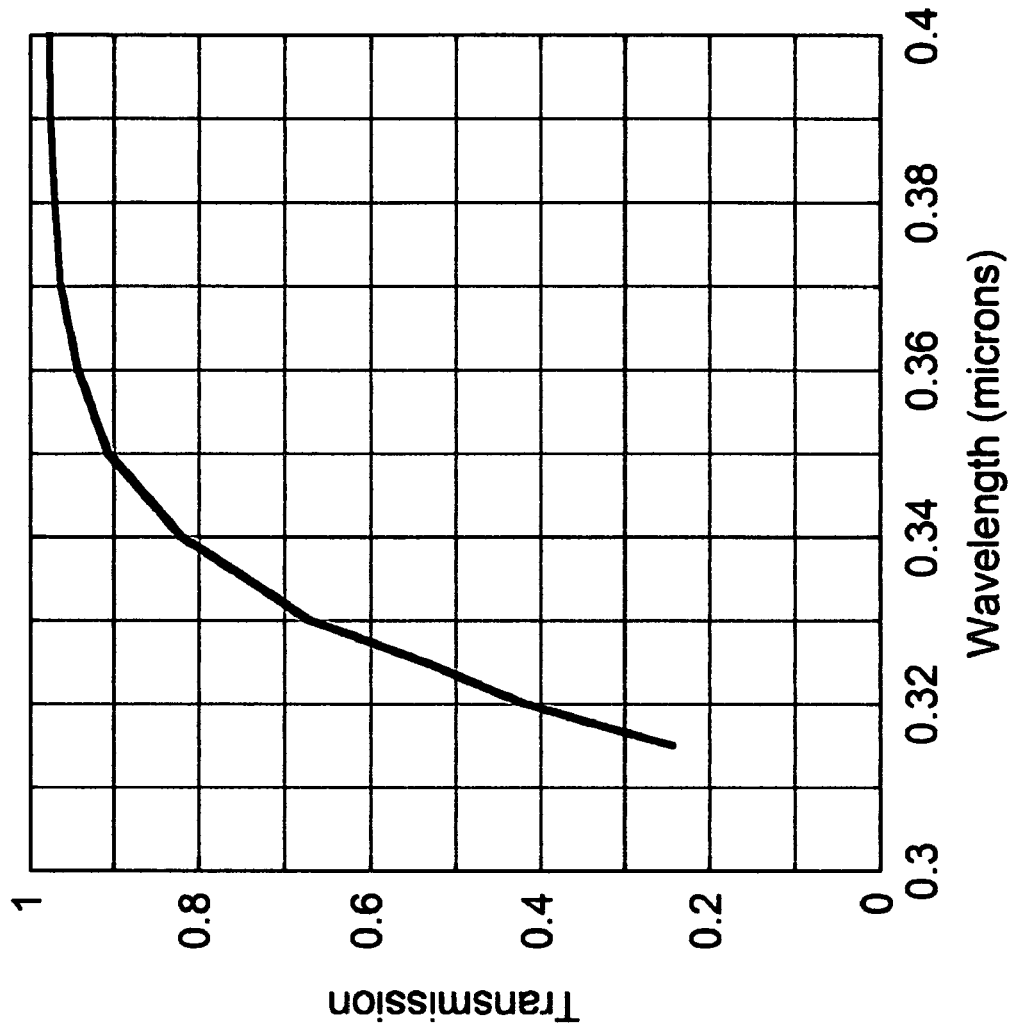
FIG. 4c is a plot of internal transmission vs. wavelength for a superachromatic macro focusing lens system according to Example 4 of the present invention.
Figure 4B:
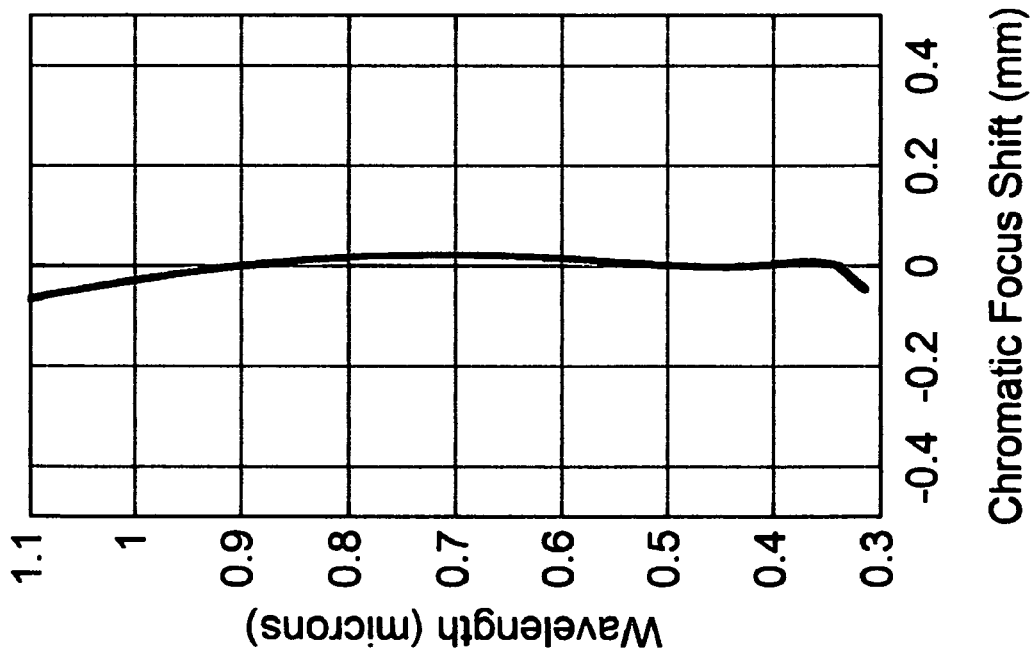
FIG. 4b is a plot of chromatic focal shift vs. wavelength for a superachromatic macro focusing lens system at a magnification setting of 0.0× according to Example 4 of the present invention.

The focal length of Example 4 is 105 mm, the aperture is f/4, the image format is 24 mm×36 mm (43.26 mm diagonal), the diagonal field of view (FOV) is 23.3 degrees, and the total transmission of the on-axis ray bundle at 315 nm is 24.4%. Chromatic focus shift vs. wavelength at a 0.7 pupil zone is illustrated in FIG. 4b, and transmission vs. wavelength is illustrated in FIG. 4c. The fact that there are four crossings in FIG. 4b indicates that this design is a true superachromat.

Figure 4D:
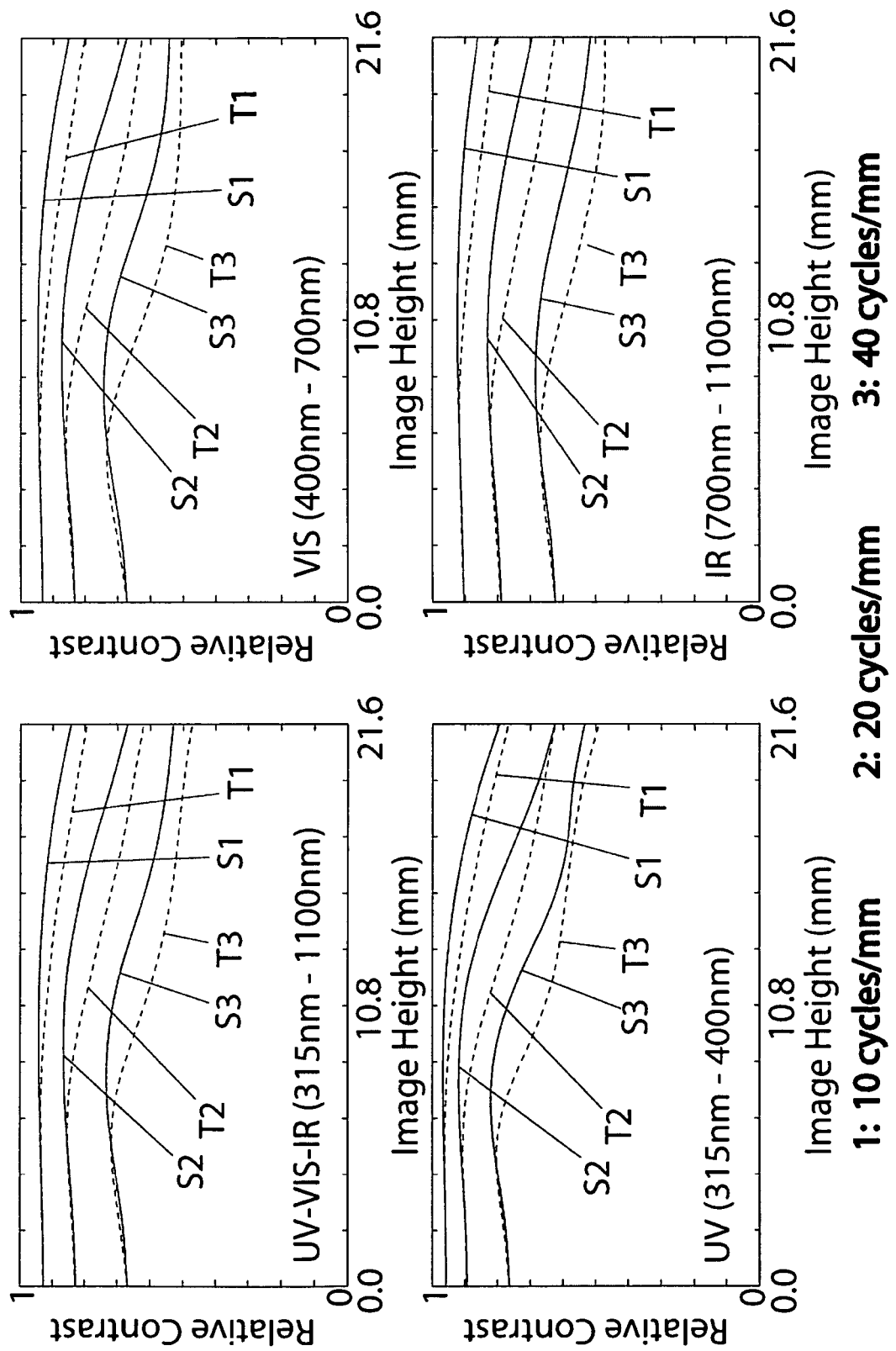
FIG. 4d are plots of MTF vs. Image Height at 10 cycles/mm, 20 cycles/mm and 40 cycles/mm for the UV-VIS-IR waveband of 315 nm-1100 nm, the UV waveband of 315 nm-400 nm, the VIS waveband of 400 nm-700 nm, and the IR waveband of 700 nm-1100 nm according to Example 4 of the present invention.

FIG. 4d illustrates the MTF of Example 4 wide open at f/4 for an object located at infinity. The four different plots are calculated for the full UV-VIS-IR waveband of 315 nm-1100 nm, the UV sub-waveband of 315 nm-400 nm, the VIS sub-waveband of 400 nm-700 nm, and the IR sub-waveband of 700 nm-1100 nm, respectively. FIG. 4d clearly demonstrates that Example 4 is well corrected over each of the UV, VIS, and IR sub-wavebands as well as for the full UV-VIS-IR waveband.

EXAMPLE 5

Figure 5A:
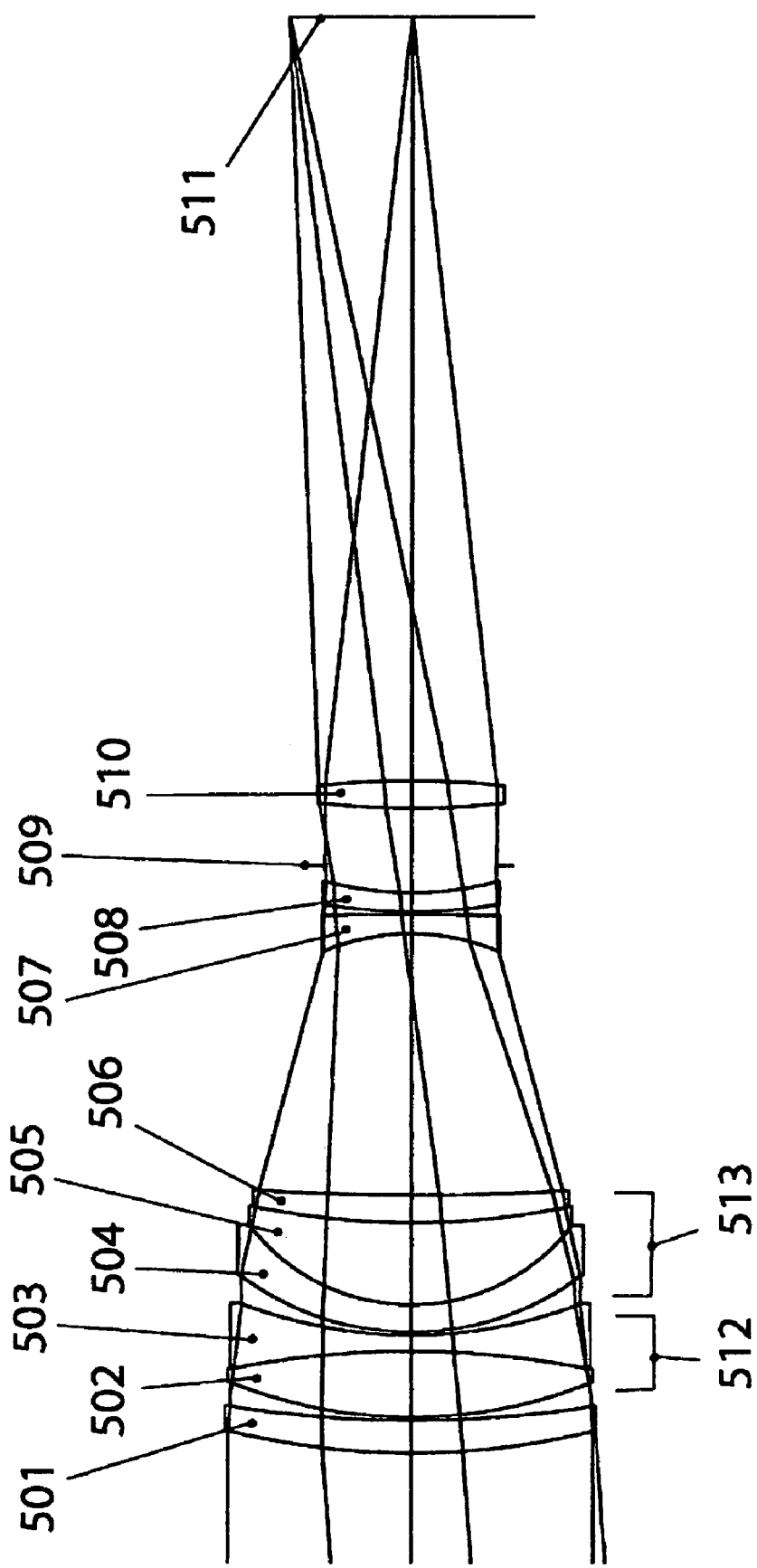
FIG. 5a is a layout drawing of a superachromatic telephoto lens system according to Example 5 of the present invention.

Example 5, which is a 300 mm focal length telephoto photographic objective for 35 mm format, is illustrated in FIG. 5a, which shows a cross-sectional layout. Like Example 4, Example 5 does not use either CaF2 or fused silica, but nonetheless achieves extremely high optical correction and acceptable optical transmission throughout the 315 nm-1100 nm waveband. Elements 502 and 505 are made from Ohara S-FPL53; elements 501 and 507 are made from Ohara S-FPL51Y; element 503 is made from Ohara S-BAL42; element 510 is made from Ohara S-BAL35; and elements 506 and 508 are made from Ohara PBL6Y. Element 509 is the aperture stop and 511 is the image plane. S-FPL53 and S-FPL51Y were found to be good substitutes for CaF2, although the transmission does drop in the short UV range as a result. S-BAL42 and S-BAL35 were found to be very good matching flints for S-FPL51Y and S-FPL53.

The use of a weak positive PBL6Y element in the positive front group and a weak negative PBL6Y element in the negative rear group was found to be very effective in improving the color correction from apochromatic to superachromatic. The normal separation of optical powers that occurs in telephoto objectives served to flatten the field without the addition of any additional unusual elements. Elements 502 and 503 are cemented together to form a doublet 512; and elements 504, 505 and 506 are cemented together to form a triplet in order to avoid tight tolerances and minimize the number of surfaces requiring AR coatings.

Figure 5C:
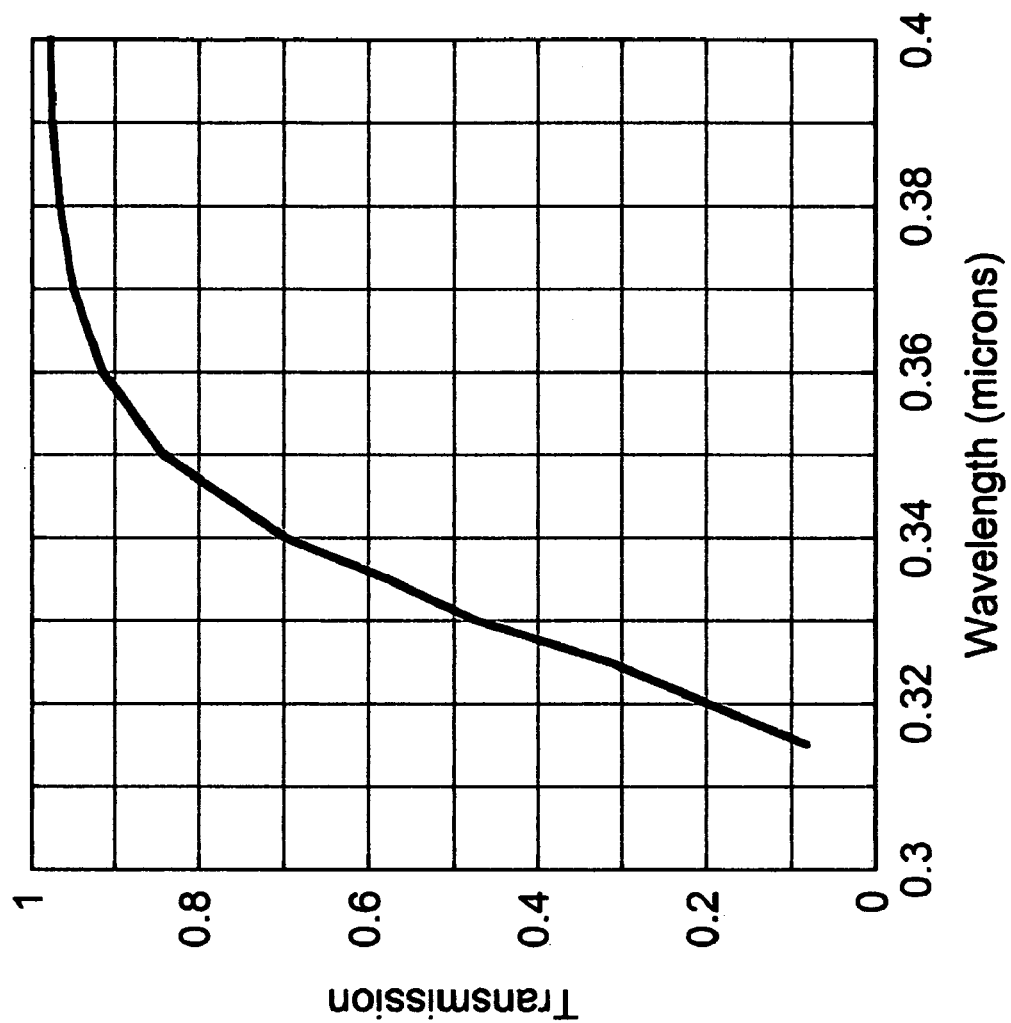
FIG. 5c is a plot of internal transmission vs. wavelength for a superachromatic telephoto lens system according to Example 5 of the present invention.
Figure 5B:
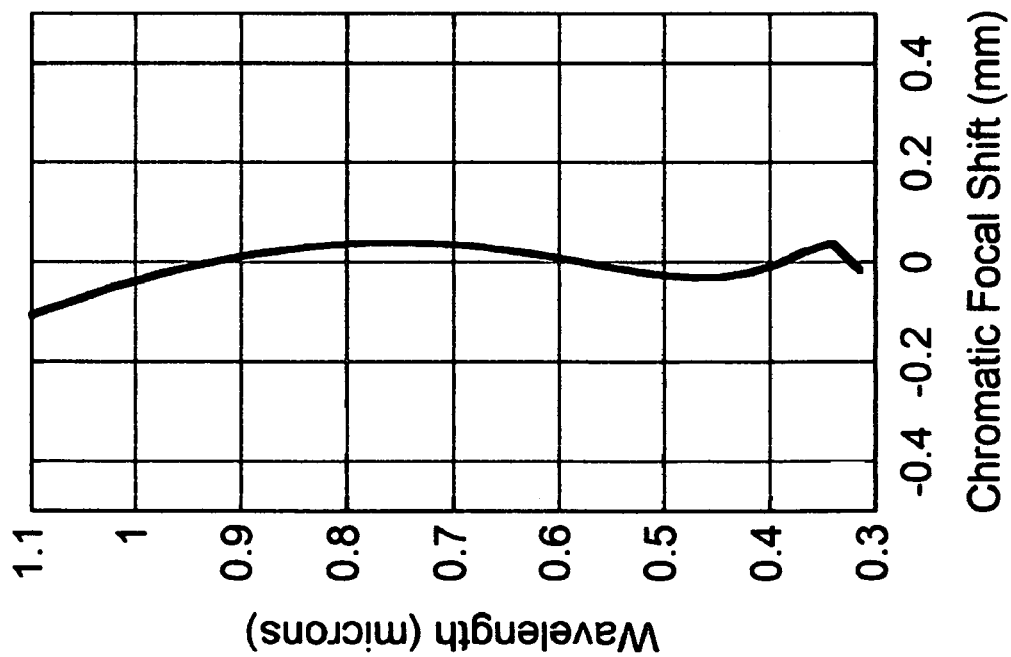
FIG. 5b is a plot of chromatic focal shift vs. wavelength for a superachromatic telephoto lens system at a magnification setting of 0.0× according to Example 5 of the present invention.

The focal length of Example 5 is 300 mm, the aperture is f/4.55, the image format is 24 mm×36 mm (43.26 mm diagonal), the diagonal field of view (FOV) is 8.2 degrees, and the total transmission of the on-axis ray bundle at 315 nm is 8.2%. Chromatic focus shift vs. wavelength at a 0.7 pupil zone is illustrated in FIG. 5*b*, and transmission vs. wavelength is illustrated in FIG. 5*c*. The fact that there are four crossings in FIG. 5*b* indicates that this design is a true superachromat.

Figure 5D:
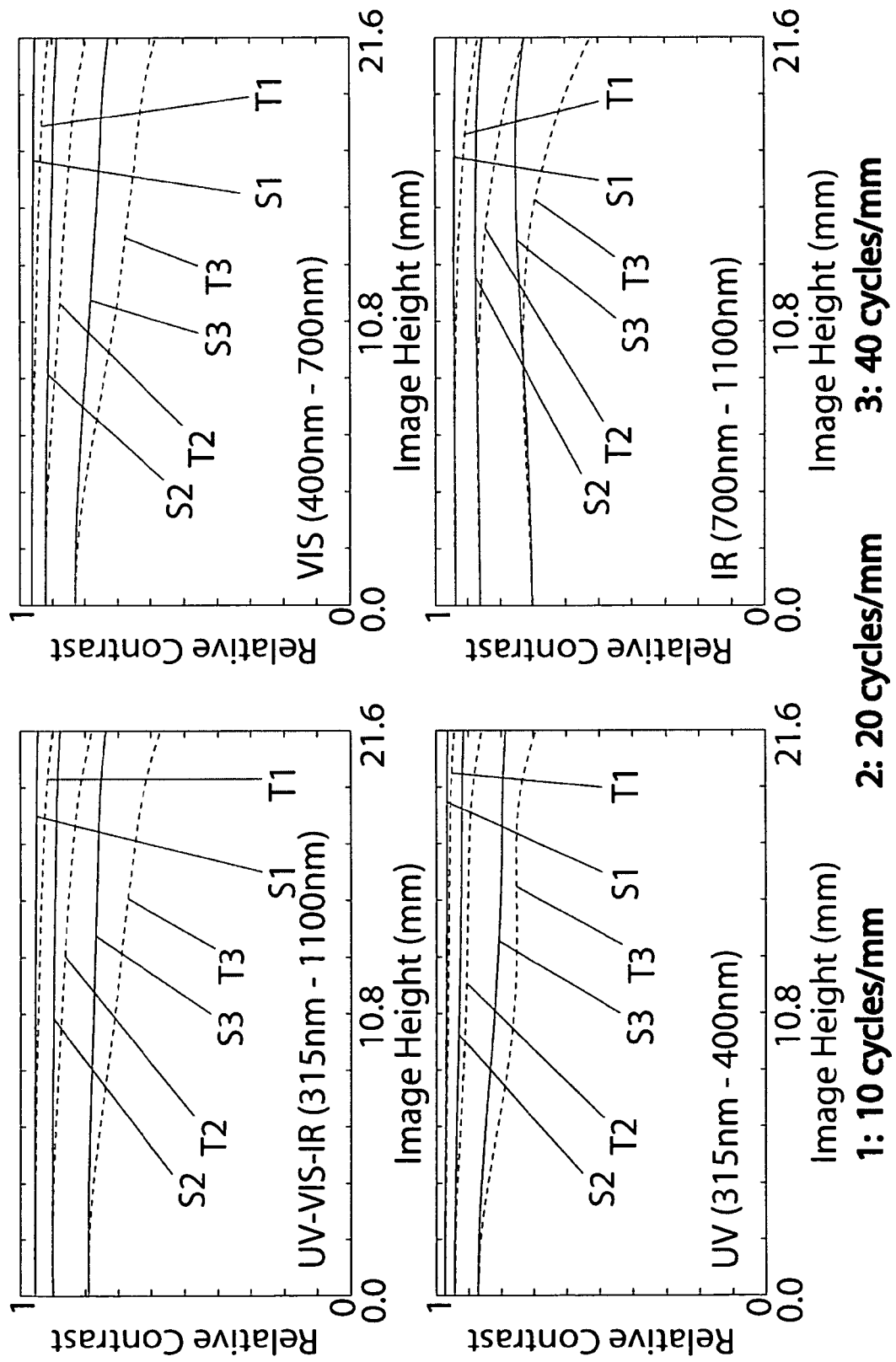
FIG. 5d are plots of MTF vs. Image Height at 10 cycles/mm, 20 cycles/mm and 40 cycles/mm for the UV-VIS-IR waveband of 315 nm-1100 nm, the UV waveband of 315 nm-400 nm, the VIS waveband of 400 nm-700 nm, and the IR waveband of 700 nm-1100 nm according to Example 5 of the present invention.

FIG. 5*d* illustrates the MTF of Example 5 wide open at f/4.55 for an object located at infinity. The four different plots are calculated for the full UV-VIS-IR waveband of 315 nm-100 nm, the UV sub-waveband of 315 nm-400 nm, the VIS sub-waveband of 400 nm-700 nm, and the IR sub-waveband of 700 nm-1100 nm, respectively. FIG. 5*d* clearly demonstrates that Example 5 is well corrected over each of the UV, VIS, and IR sub-wavebands as well as for the full UV-VIS-IR waveband.

EXAMPLE 6

Figure 6A:
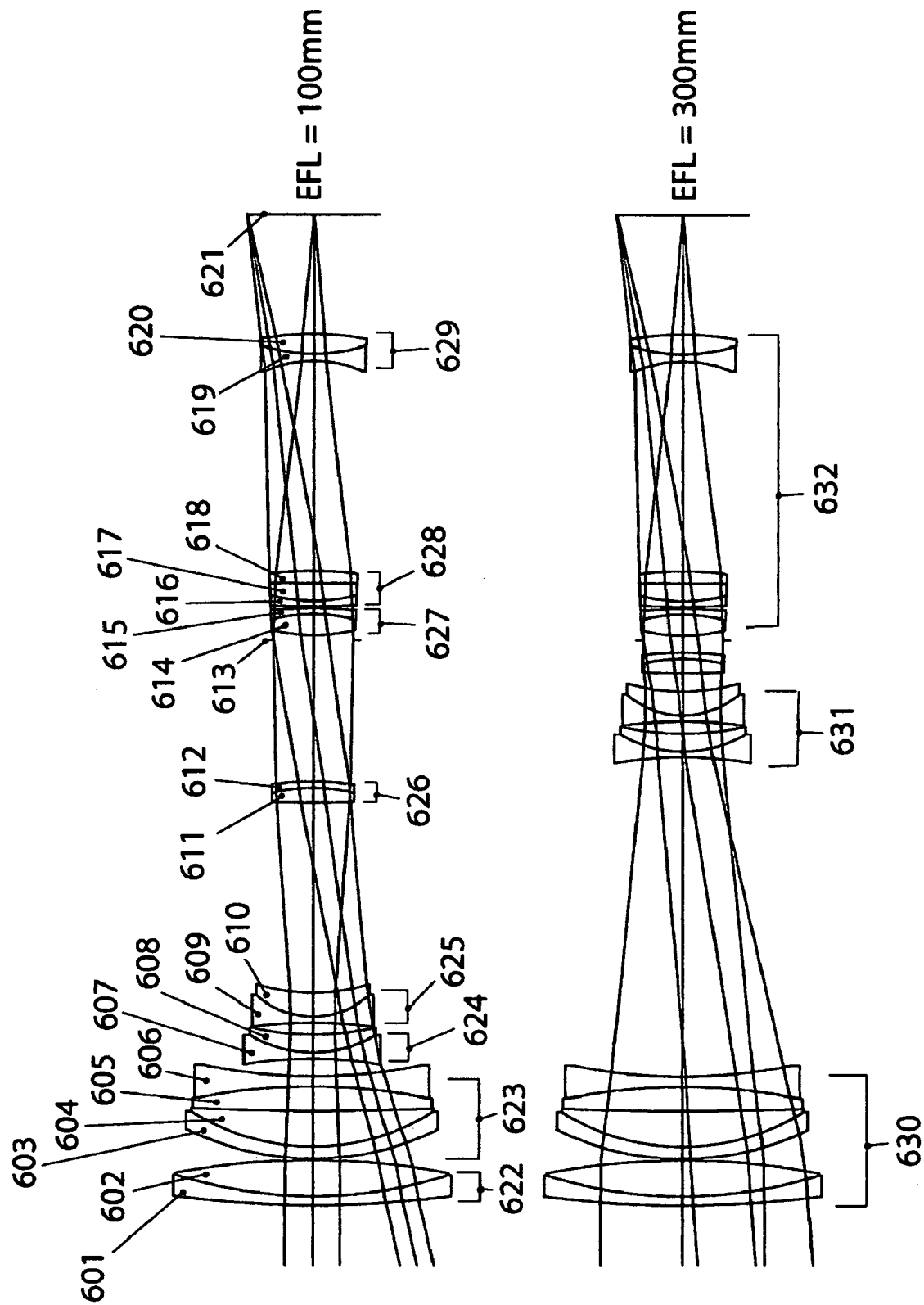
FIG. 6a is a layout drawing of a superachromatic zoom lens system showing focal length positions of 100 mm and 300 mm according to Example 6 of the present invention.

Example 6, which is a 100 mm-300 mm focal length zoom photographic objective for 35 mm format, is illustrated in FIG. 6*a*, which shows cross-sectional layouts for focal length positions of 100 mm and 300 mm. Elements 602, 604, 607, 609, 611, 614, 617 and 619 are made from CaF2; elements 610 and 620 are made from SiO2; elements 606 and 612 are made from Ohara S-BAL42; element 601 is made from Ohara S-LAL12; element 615 is made from Ohara S-LAL14; elements 608 and 616 are made from Ohara S-LAL18; and elements 603, 605 and 618 are made from Ohara PBL6Y. Element 613 is the aperture stop and 621 is the image plane. Despite the fact that fully 10 of its 19 elements are made from either CaF2 or fused silica, the overall transmission of Example 6 at 315 nm is just barely acceptable at 7.6%. The reason for this is that the various zooming groups must be independently color corrected, and thus some modifying glass types such as lanthanum crowns and light flints are necessary. This example serves to illustrate the difficulty of designing a complex zoom system suitable for the 315 nm-1100 nm waveband. CaF2 is extensively used as the material for positive elements in positive-powered groups and for negative elements in negative-powered groups. S-BAL42, S-LAL12, S-LAL14 and S-LAL18 are used as matching flints; and weak PBL6Y elements are used to achieve superachromatic performance.

The large separation of optical powers combined with the negative-powered group 629 near the image plane ensures excellent correction for field curvature. All elements are combined in cemented groups of 2 (622, 624, 625, 626, 627 and 629), 3 (628), or 4 (623) elements. This allows the system to achieve excellent wideband correction while minimizing the number of air-glass interfaces and keeping the tolerances as loose as possible.

Figure 6C:
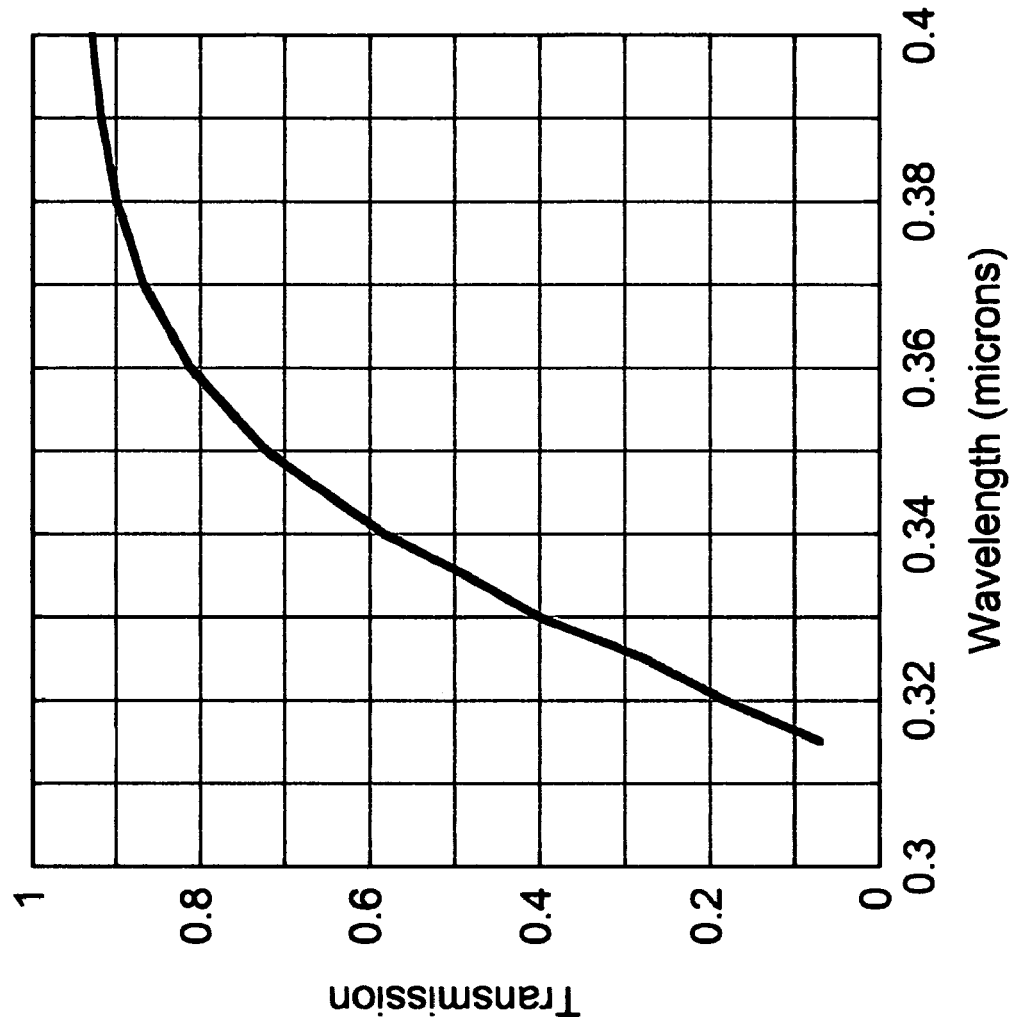
FIG. 6c is a plot of internal transmission vs. wavelength for a superachromatic zoom lens system according to Example 6 of the present invention.
Figure 6B:
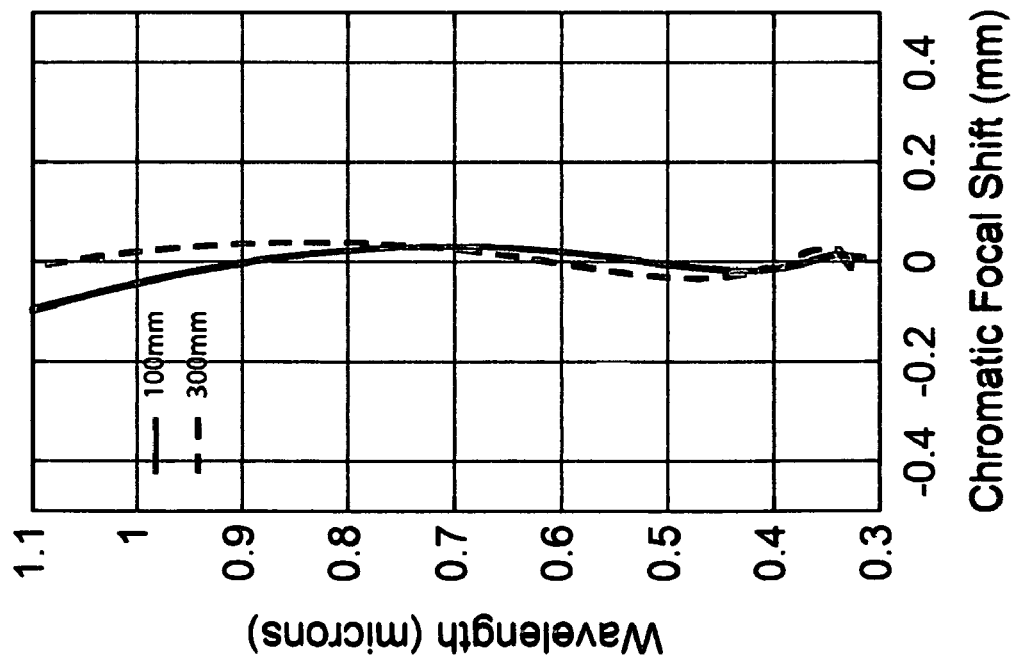
FIG. 6b is a plot of chromatic focal shift vs. wavelength for a superachromatic zoom lens system at focal length positions of 100 mm and 300 mm according to Example 6 of the present invention.

The focal length of Example 6 is continuously variable from 100 mm to 300 mm, the aperture is constant throughout the zoom range at f/5.6, the image format is 24 mm×36 mm (43.26 mm diagonal), the diagonal field of view (FOV) ranges from 24.4 to 8.2 degrees, and the total transmission of the on-axis ray bundle at 315 nm is 7.6%. Chromatic focus shift vs. wavelength at a 0.7 pupil zone for both 100 mm and 300 mm focal lengths are illustrated in FIG. 6*b*, and transmission vs. wavelength is illustrated in FIG. 6*c*. The fact that there are four crossings for both curves in FIG. 6*b* indicates that this design is a true superachromat throughout the zoom range.

Figure 6D:
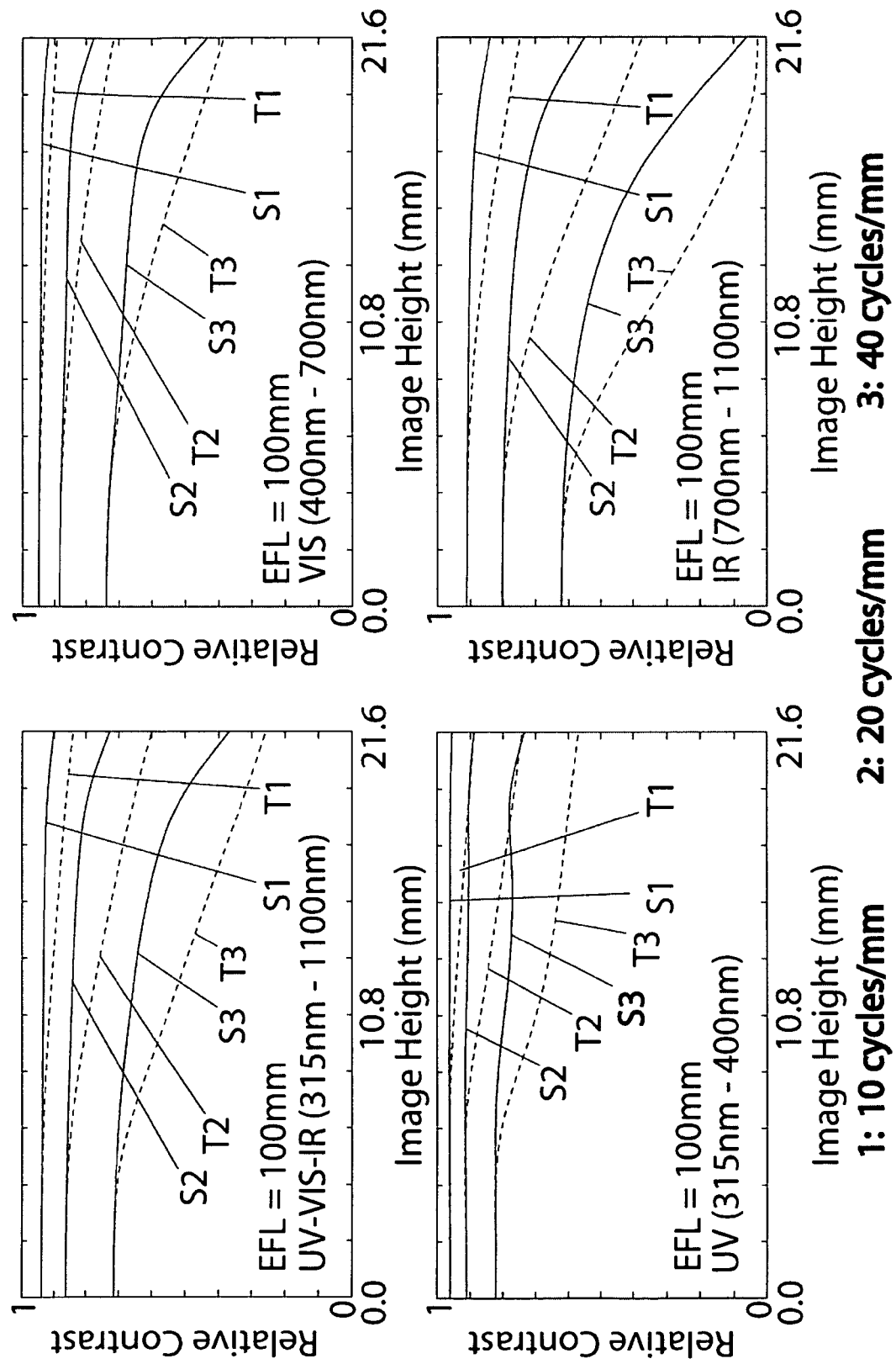
FIG. 6d are plots of MTF vs. Image Height at 10 cycles/mm, 20 cycles/mm and 40 cycles/mm for the UV-VIS-IR waveband of 315 nm-1100 nm, the UV waveband of 315 nm-400 nm, the VIS waveband of 400 nm-700 nm, and the IR waveband of 700 nm-1100 nm according to Example 6 of the present invention when it is adjusted to a focal length of 100 mm.

FIG. 6*d* illustrates the MTF of Example 6 wide open at f/5.6 for an object located at infinity when the lens is adjusted to its shortest focal length of 100 mm. The four different plots are calculated for the full UV-VIS-IR waveband of 315 nm-1100 nm, the UV sub-waveband of 315 nm-400 nm, the VIS sub-waveband of 400 nm-700 nm, and the IR sub-waveband of 700 nm-1100 nm, respectively. FIG. 6*d* demonstrates that Example 6 is well corrected at the 100 mm focal length over each of the UV, VIS, and IR sub-wavebands as well as for the full UV-VIS-IR waveband.

Figure 6E:
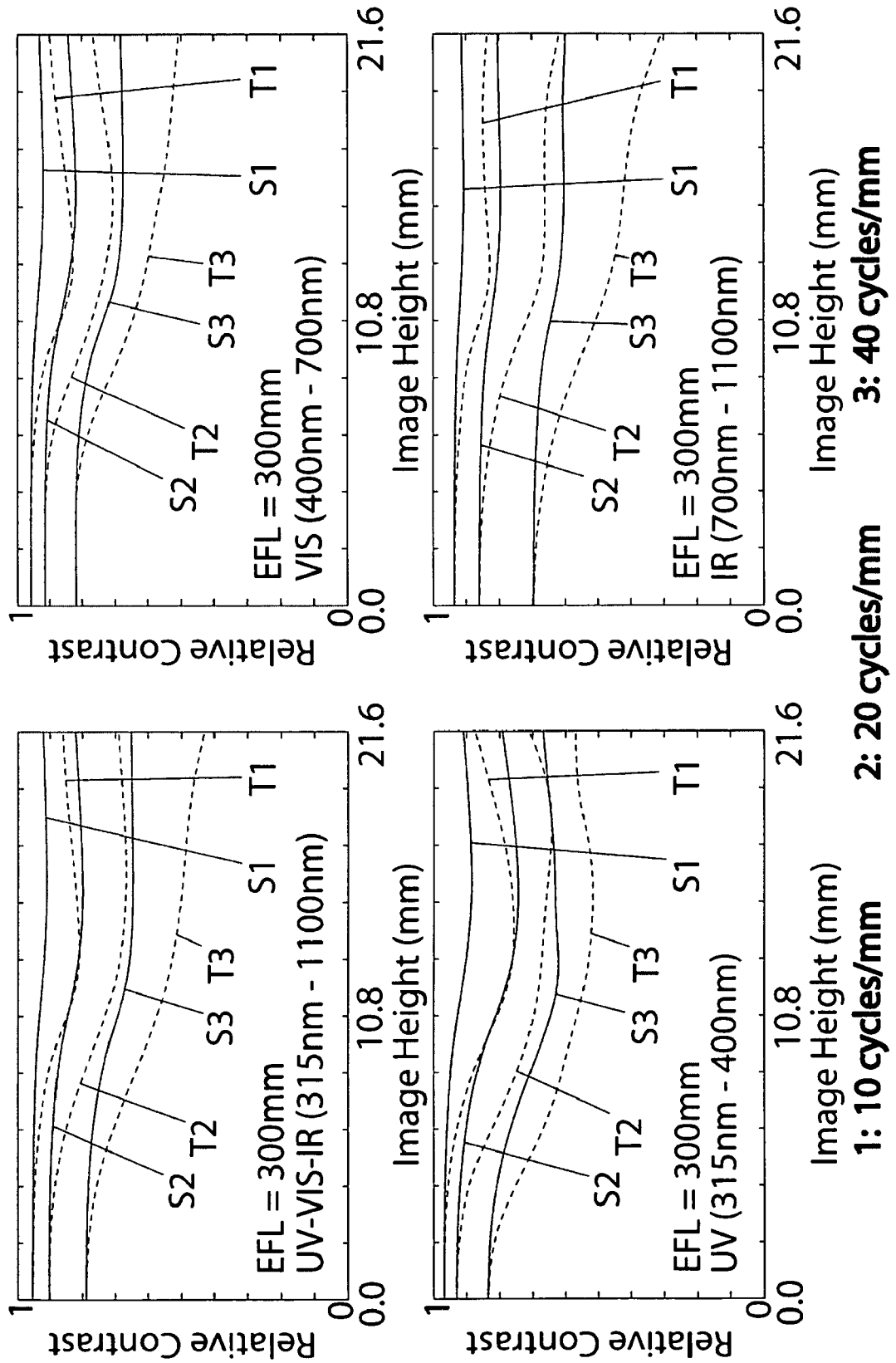
FIG. 6e are plots of MTF vs. Image Height at 10 cycles/mm, 20 cycles/mm and 40 cycles/mm for the UV-VIS-IR waveband of 315 nm-1100 nm, the UV waveband of 315 nm-400 nm, the VIS waveband of 400 nm-700 nm, and the IR waveband of 700 nm-1100 nm according to Example 6 of the present invention when it is adjusted to a focal length of 300 mm.

FIG. 6*e* illustrates the MTF of Example 6 wide open at f/5.6 for an object located at infinity when the lens is adjusted to its longest focal length of 300 mm. The four different plots are calculated for the full UV-VIS-IR waveband of 315 nm-1100 nm, the UV sub-waveband of 315 nm-400 nm, the VIS sub-waveband of 400 nm-700 nm, and the IR sub-waveband of 700 nm-100 nm, respectively. FIG. 6*e* demonstrates that Example 6 is well corrected at the 300 mm focal length over each of the UV, VIS, and IR sub-wavebands as well as for the full UV-VIS-IR waveband.

EXAMPLE 7

Figure 7A:
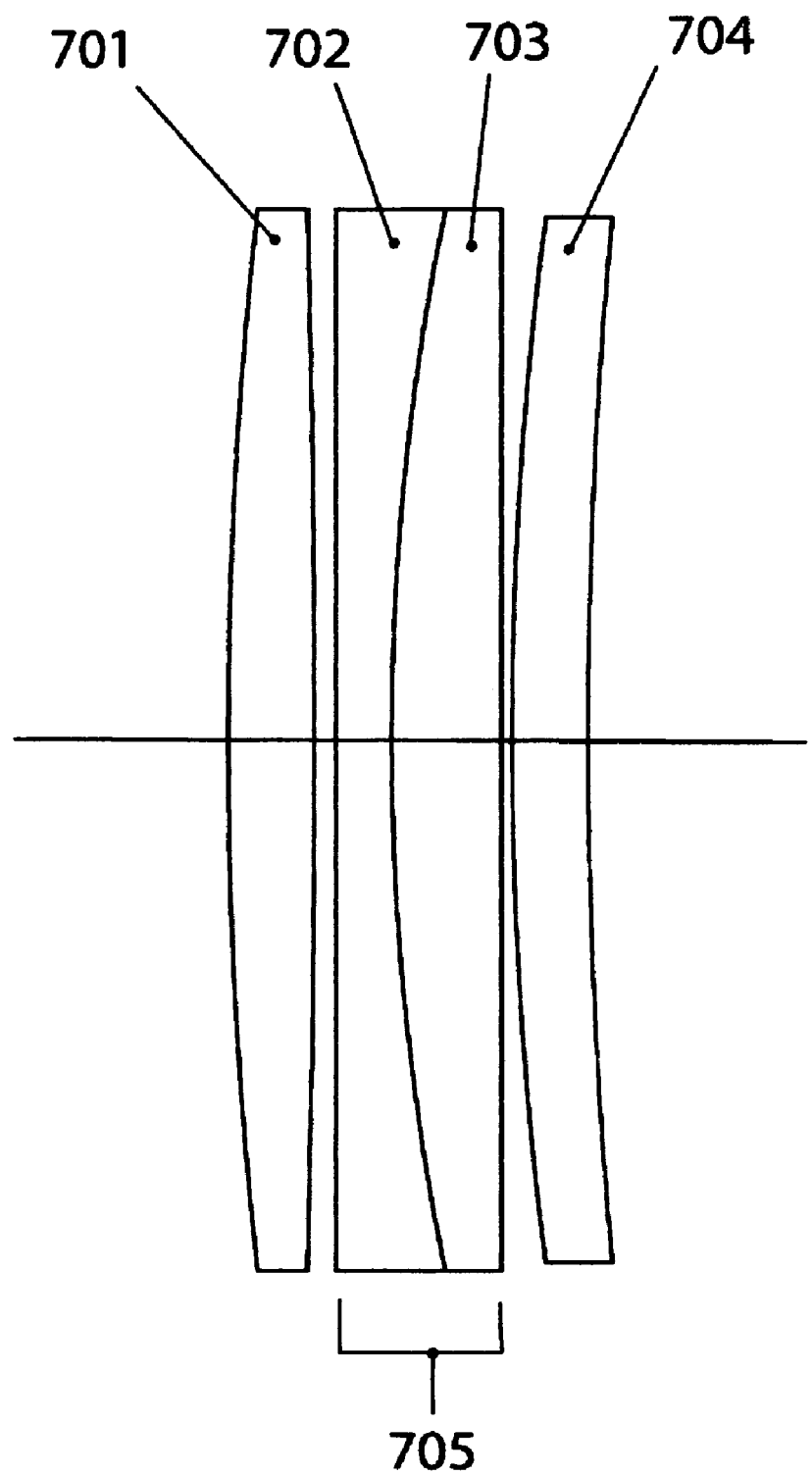
FIG. 7a is a layout drawing of a superachromatic telescope objective according to Example 7 of the present invention.

Example 7, which is a 1000 mm focal length telescope objective, is illustrated in FIG. 7*a*, which shows a cross-sectional layout. Element 701 is made from S-FPL53, element 702 is made from Ohara S-BAL42, element 703 is made from CaF2 and element 704 is made from Ohara PBL6Y. This design has moderate internal transmission at 315 nm because the elements are fairly thick and because several glasses having moderate UV transmission loss were required to achieve superachromatic color correction. In particular, the positive-powered element 704 made from PBL6Y is used for fine adjustment of the UV portion of the color curve to improve the color correction from apochromatic to superachromatic. Elements 702 and 703 are cemented together to form a doublet 705 in order to improve tolerances and minimize the number of surfaces that must be AR coated.

Figure 7C:
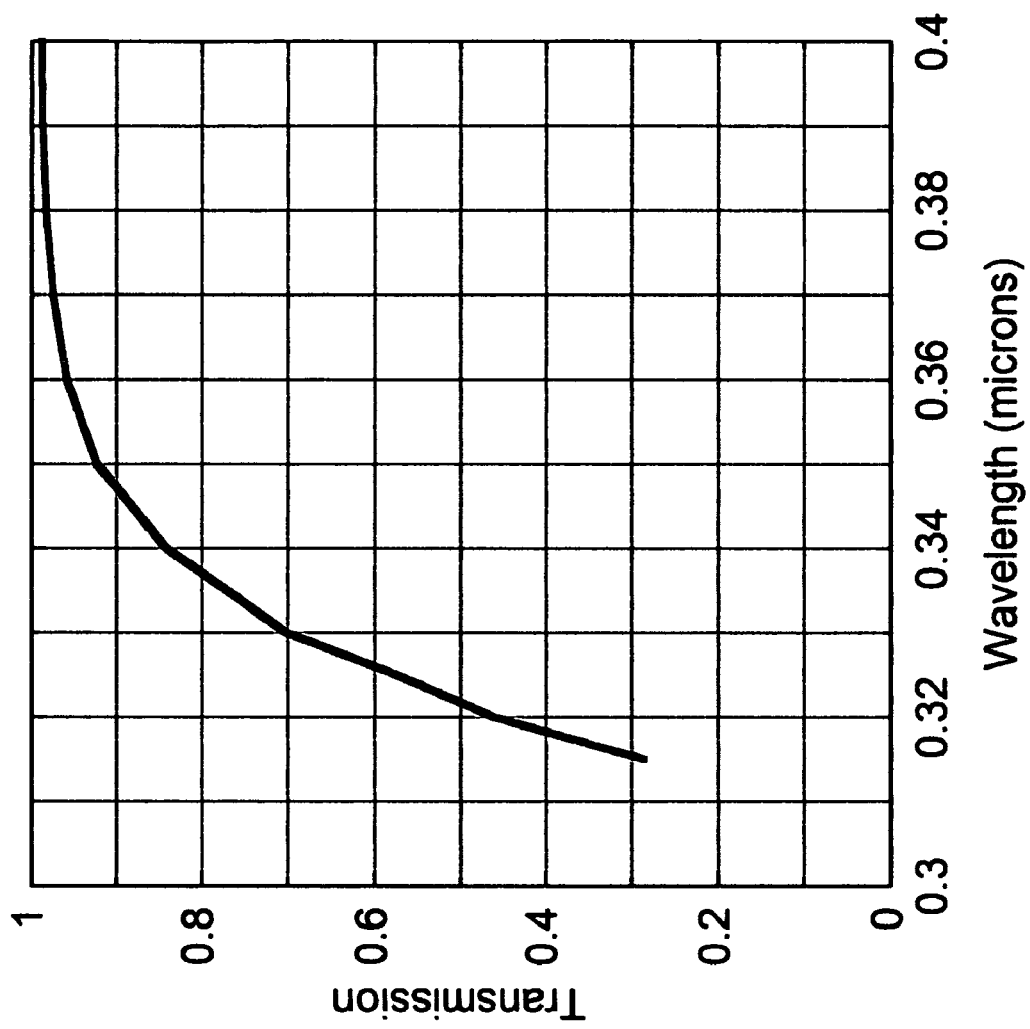
FIG. 7c is a plot of internal transmission vs. wavelength for a superachromatic telescope objective according to Example 7 of the present invention.
Figure 7B:
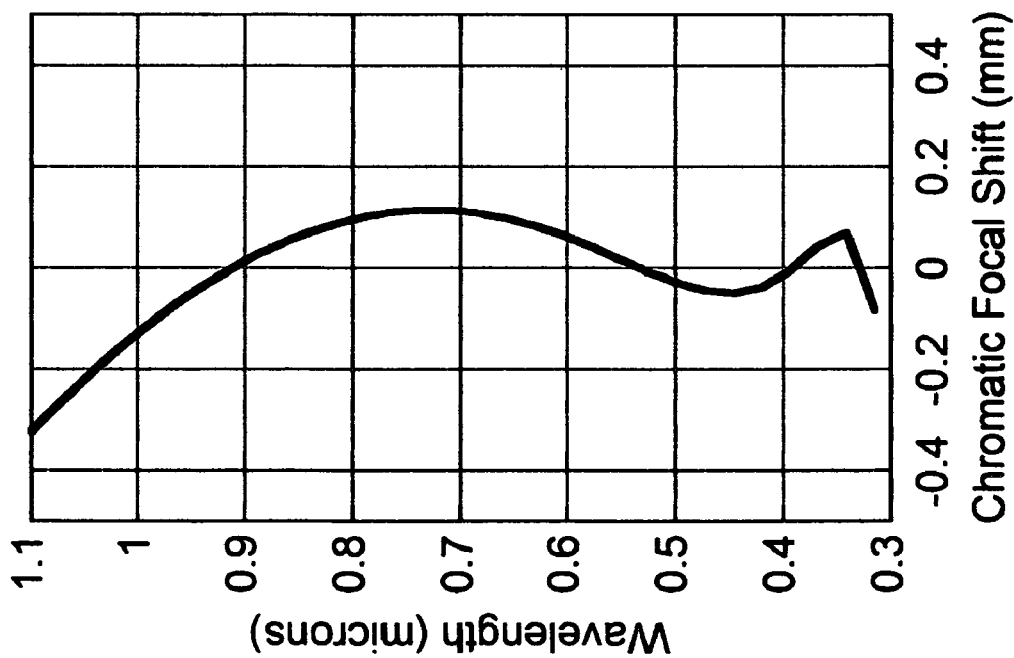
FIG. 7b is a plot of chromatic focal shift vs. wavelength for a superachromatic telescope objective according to Example 7 of the present invention.
Figure 7D:
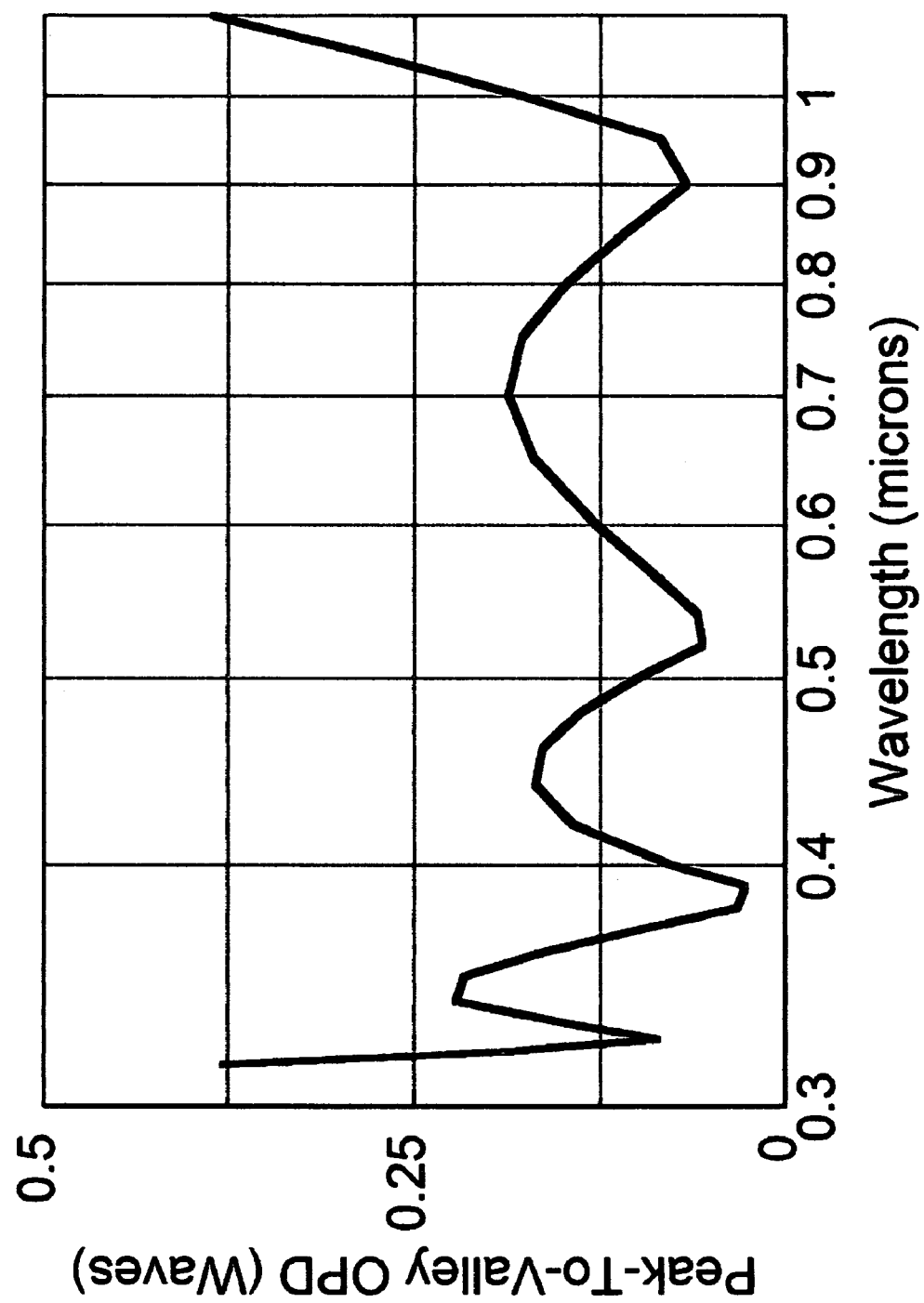
FIG. 7d is a plot of on-axis peak-to-valley wavefront error vs. wavelength for a superachromatic telescope objective according to Example 7 of the present invention.

The focal length of Example 7 is 1000 mm, the aperture is f/10, the diagonal field of view (FOV) is 0.5 degrees, and the total transmission of the on-axis ray bundle at 315 nm is 28.6%. Chromatic focus shift vs. wavelength at a 0.7 pupil zone is illustrated in FIG. 7*b*, and transmission vs. wavelength is illustrated in FIG. 7*c*. The fact that there are four crossings in FIG. 7*b* indicates that this design is a true superachromat. FIG. 7*d* illustrates the on-axis peak-to-valley wavefront error vs. wavelength for Example 7, and it clearly indicates that Example 7 is well-corrected.

EXAMPLE 8

Figure 8A:
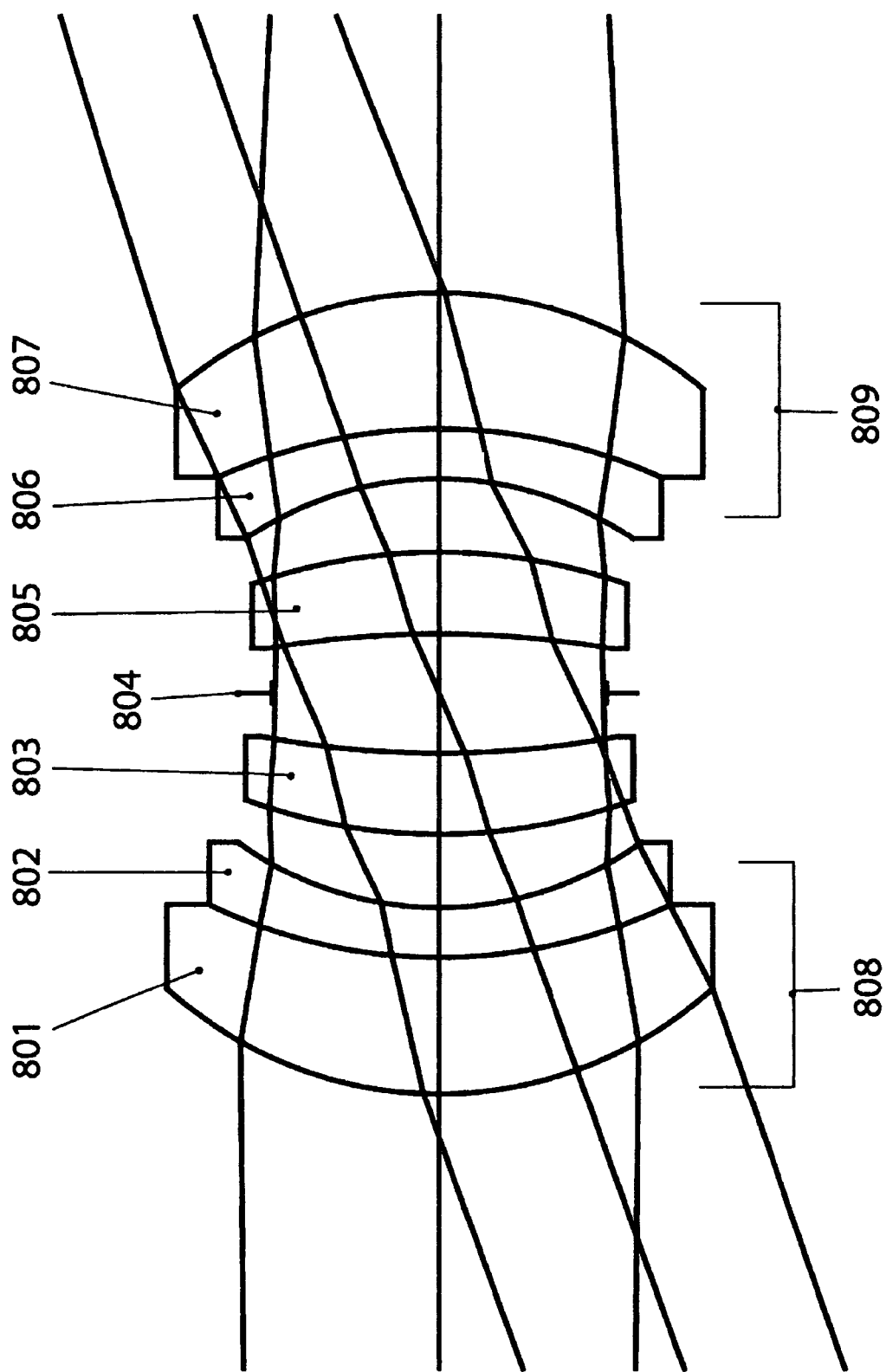
FIG. 8a is a layout drawing of an apochromatic large format lens system according to Example 8 of the present invention.

Example 8, which is a 180 mm focal length photographic objective for 72 mm×96 mm digital scanning format, is illustrated in FIG. 8a, which shows a cross-sectional layout. Elements 801, 803, 805, and 807 are made from CaF2; and elements 802 and 806 are made from Ohara S-BAL42. Element 804 is the aperture stop. This design has a very high internal transmission throughout the 315 nm-1100 nm waveband because four of the six elements are CaF2 and the two S-BAL42 elements have very good transparency. The negative powered S-BAL42 elements 802 and 806 serve as matching flints for the positive powered CaF2 elements, and results in Example 8 is composed from just two different optical materials, which has been found to be the minimum needed to ensure both good optical correction and good transparency over the entire 315 nm-1100 nm waveband. Elements 801 and 802, and elements 806 and 807, are cemented together to form doublets 808 and 809 in order to avoid tight tolerances and to minimize the number of air-glass interfaces that must be AR coated. This latter point is important because AR coatings for the very broad 315 nm-1100 nm waveband pose special challenges.

In order to ensure symmetry and to reduce manufacturing costs, doublets 808 and 809 are identical, and elements 803 and 805 have the same convex radius.

Example 8 is optimized for best performance at a magnification of −0.2×. However due to the symmetry of the design it can be used for high quality imagery over a very broad magnification range, including but not limited to 0 to −1×.

Figure 8C:
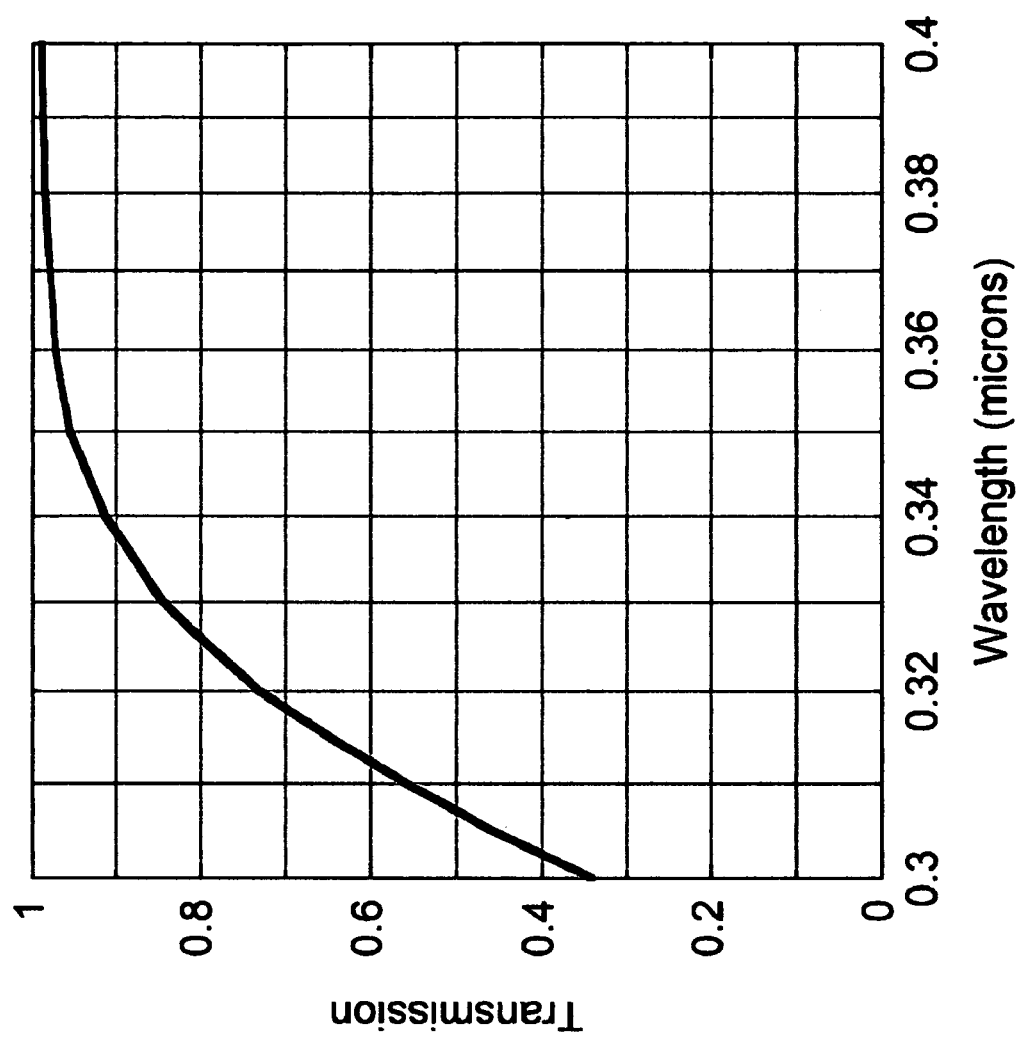
FIG. 8c is a plot of internal transmission vs. wavelength for an apochromatic large format lens system according to Example 8 of the present invention.
Figure 8B:
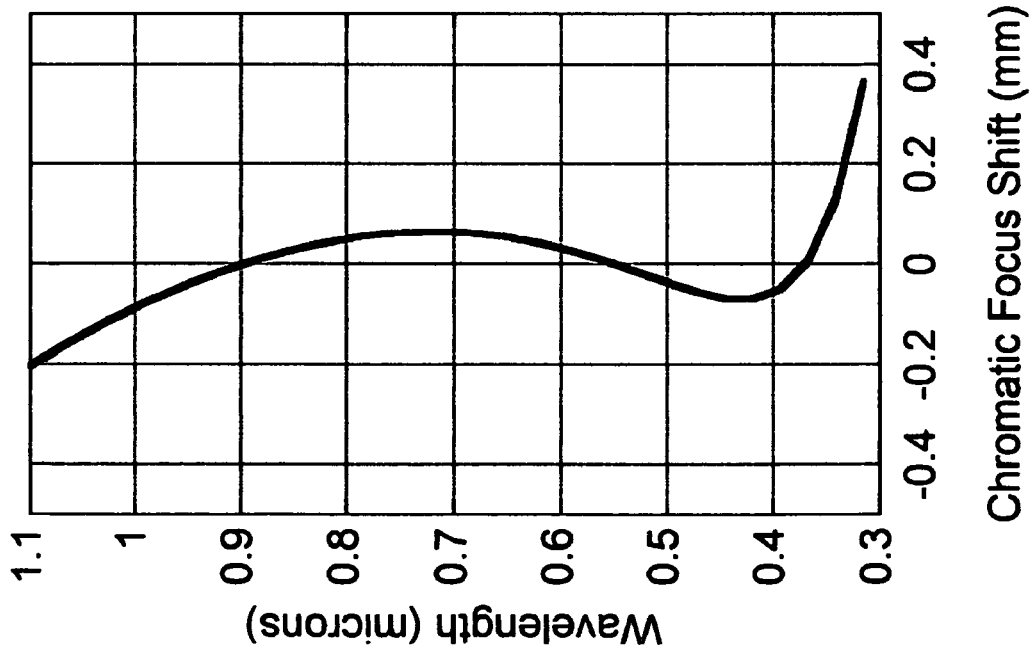
FIG. 8b is a plot of chromatic focal shift vs. wavelength for an apochromatic large format lens system at a magnification setting of −0.2× according to Example 8 of the present invention.

The focal length of Example 8 is 180 mm, the aperture is f/9, the intended image format is 72 mm×96 mm, the image circle diameter at f/9 is 125 mm, the image circle diameter at f/11 is 150 mm, and the total transmission of the on-axis ray bundle at 315 nm is 65%. Chromatic focus shift vs. wavelength at a 0.7 pupil zone is illustrated in FIG. 8b, and transmission vs. wavelength is illustrated in FIG. 8c. The fact that there are three crossings in FIG. 8b indicates that this design is a true apochromat.

Figure 8D:
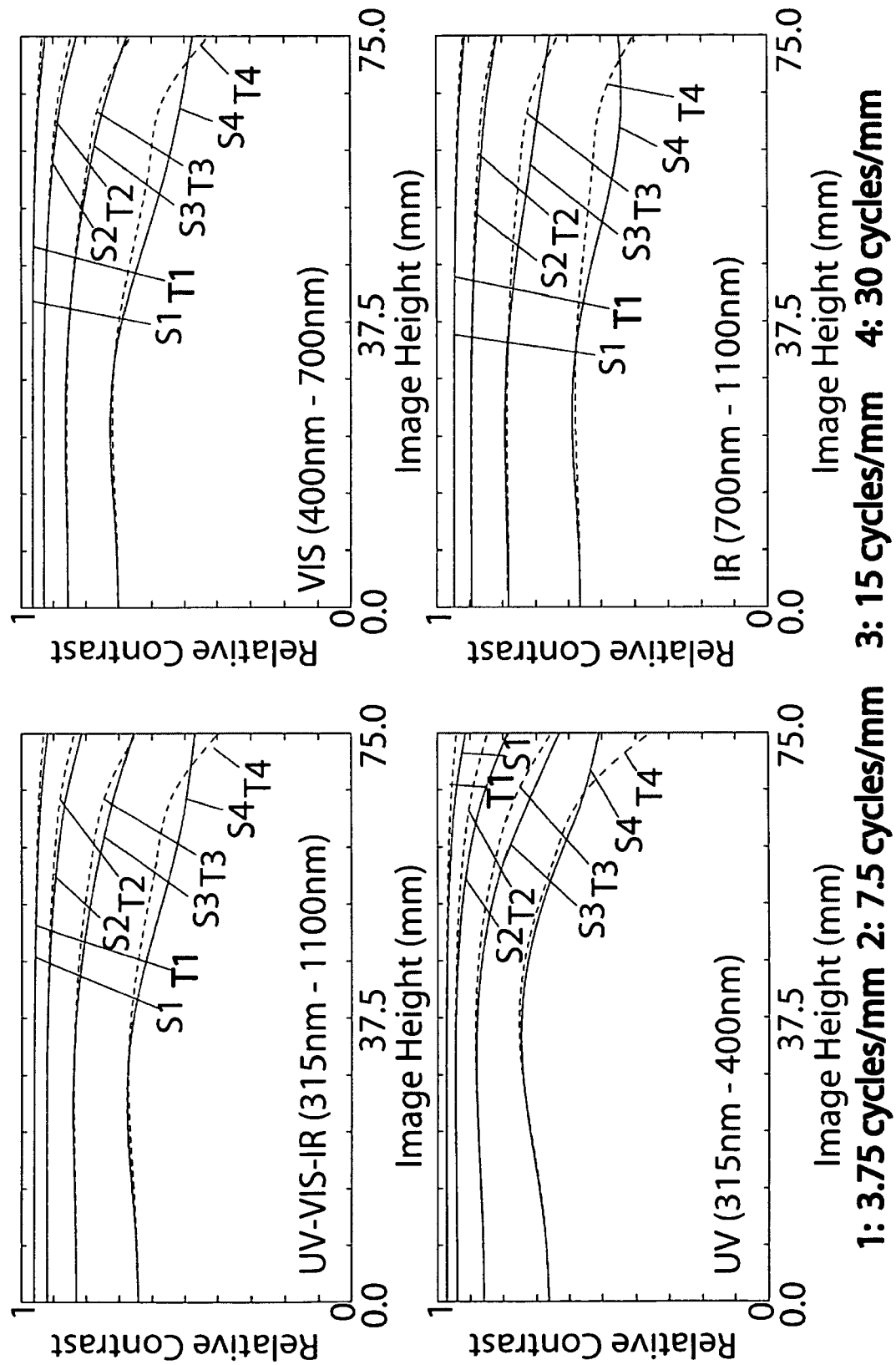
FIG. 8d are plots of MTF vs. Image Height at 3.75 cycles/mm, 7.5 cycles/mm, 15 cycles/mm and 30 cycles/mm for the UV-VIS-IR waveband of 315 nm-1100 nm, the UV waveband of 315 nm-400 nm, the VIS waveband of 400 nm-700 nm, and the IR waveband of 700 nm-1100 nm according to Example 8 of the present invention at a magnification of −0.2×.

FIG. 8d illustrates the MTF of Example 8 stopped down to f/11 for an object magnification of −0.2×. The four different plots are calculated for the full UV-VIS-IR waveband of 315 nm-1100 nm, the UV sub-waveband of 315 nm-400 nm, the VIS sub-waveband of 400 nm-700 nm, and the IR sub-waveband of 700 nm-1100 nm, respectively. FIG. 1d clearly demonstrates that Example 8 is well corrected over each of the UV, VIS, and IR sub-wavebands as well as for the full UV-VIS-IR waveband.

Optical Prescription Data

Tables 1a, 2a, 3a, 4a, 5a, 6a, 7 and 8a below provide optical prescription data for Examples 1, 2, 3, 4, 5, 6, 7 and 8, respectively. The data provided includes surface number, radius of curvature, thickness, glass type, and the diameter of the clear aperture. OBJ refers to the object surface, IMA refers to the image surface, and STO refers to the aperture stop surface. A listing of refractive index at various wavelengths for all of the glass types used in the Examples is provided in Table 9. A listing of transmission at various wavelengths for all of the glass types used in the Examples is provided in Table 10. Tables 1b, 2b, 3b, 4b, 5b and 8b provide focusing data for Examples 1, 2, 3, 4, 5, and 8, respectively. In these tables OBMG refers to object magnification, and OBIM refers to the total distance from the object plane to the image plane. Table 6b provides zooming data for Example 6.

TABLE 1a

Prescription for Example 1

| Surf | Radius | Thickness | Glass | Diameter |
|---|---|---|---|---|
| OBJ | Infinity | Infinity | | |
| 1 | −823.3225 | 2.5 | CaF2 | 29.3178 |
| 2 | 23.62555 | 6.960704 | | 26.17896 |
| 3 | −30.92741 | 6 | SiO2 | 26.16494 |
| 4 | −43.59143 | 0.25 | | 27.48283 |
| 5 | Infinity | 5 | CaF2 | 27.5102 |
| 6 | −58.28956 | 0.25 | | 27.53578 |
| 7 | 30.26674 | 6 | CaF2 | 26.48707 |
| 8 | −283.0473 | 0.25 | | 25.31733 |
| 9 | 21.95736 | 5 | CaF2 | 22.71337 |
| 10 | 106.7086 | 5.851342 | | 20.7204 |
| 11 | Infinity | 1.5 | S-LAL18 | 17 |
| 12 | 18.58444 | 4 | | 15.6 |
| STO | Infinity | 3 | | 15.4 |
| 14 | 36.36482 | 2 | SiO2 | 18 |
| 15 | 18.18018 | 7 | CaF2 | 18 |
| 16 | −33.33136 | 1 | | 18 |
| 17 | 55.47859 | 7 | SiO2 | 28 |
| 18 | −55.47859 | 4.320931 | | 28 |
| 19 | −42.78595 | 2 | SiO2 | 28 |
| 20 | 40.26281 | 43 | | 28 |
| IMA | Infinity | | | 43.26 |

TABLE 1b

Focusing Data for Example 1

| OBMG | 0.0 | −0.5 |
|---|---|---|
| OBIM | Infinity | 282.687 |
| T0 | Infinity | 141.327 |
| T16 | 1.000 | 29.477 |
| T20 | 43.000 | 43.000 |

TABLE 2a

Prescription for Example 2

| Surf | Radius | Thickness | Glass | Diameter |
|---|---|---|---|---|
| OBJ | Infinity | Infinity | | |
| 1 | 178.9374 | 3 | S-BAL42 | 54.19571 |
| 2 | 37.12031 | 11.81699 | | 46.44078 |
| 3 | −82.30732 | 3 | S-FPL51 | 46.27681 |
| 4 | 74.43883 | 26.5369 | | 45.16653 |
| 5 | −92.06594 | 6 | S-FSL5 | 48.04621 |
| 6 | −46.21091 | 0.25 | | 48.66189 |
| 7 | 54.40835 | 8 | S-FPL51 | 46.5076 |
| 8 | −1000 | 18.31158 | | 45.45454 |
| 9 | −55.12425 | 2 | S-FSL5 | 34.69855 |
| 10 | Infinity | 0.25 | | 33.824 |
| 11 | 60.14009 | 7.5 | CaF2 | 33.11116 |
| 12 | −60.14009 | 0.25 | | 32.00604 |
| 13 | 30.24264 | 4 | S-FSL5 | 27.05836 |
| 14 | 36.9668 | 9.210883 | | 24.40765 |
| 15 | Infinity | 5 | S-BSL7 | 16.96275 |
| 16 | Infinity | 5 | | 14.08928 |
| STO | Infinity | 3 | | 12.98974 |
| 18 | −21.95561 | 5 | S-LAL14 | 12.62843 |
| 19 | 27.29333 | 5 | CaF2 | 14.08492 |
| 20 | −22.58562 | 0.25 | | 16.25756 |
| 21 | 36.26979 | 6 | CaF2 | 18.93626 |
| 22 | −34.77702 | 0.25 | | 20.19005 |
| 23 | 34.20313 | 10.28747 | S-FSL5 | 21.18505 |
| 24 | 21 | 39.98675 | | 20.96429 |
| IMA | Infinity | | | 43.26 |

TABLE 2b

Focusing Data for Example 2

| | | | |
|---|---|---|---|
| OBMG | 0.0 | −0.068 | −0.244 |
| OBIM | Infinity | 677.966 | 300.000 |
| T0 | Infinity | 500.000 | 125.661 |
| T8 | 18.312 | 13.856 | 3.986 |
| T22 | 39.987 | 42.508 | 48.759 |

TABLE 3a

Prescription for Example 3

| Surf | Radius | Thickness | Glass | Diameter |
|---|---|---|---|---|
| OBJ | Infinity | Infinity | | |
| 1 | 289.9711 | 5 | SiO2 | 79.05 |
| 2 | 1354.911 | 0.5 | | 75.70 |
| 3 | 136.415 | 3 | S-FPL51Y | 67.00 |
| 4 | 33.15553 | 9.585237 | | 51.45 |
| 5 | 121.2221 | 3 | CaF2 | 51.35 |
| 6 | 36.68149 | 7.647171 | | 44.81 |
| 7 | 2759.061 | 3 | CaF2 | 44.75 |
| 8 | 41.26276 | 21.28223 | | 41.43 |
| 9 | −35.76691 | 4.9 | SiO2 | 40.66 |
| 10 | −32.24192 | 25.50439 | | 41.91 |
| 11 | 59.03646 | 7 | CaF2 | 33.54 |
| 12 | −93.98464 | 12.22416 | | 32.46 |
| 13 | −151.9888 | 3 | S-BAL42 | 26 |
| 14 | −396.8509 | 0.7748805 | | 26 |
| 15 | 29.53042 | 5.426116 | CaF2 | 24 |
| 16 | 118.5459 | 3.692058 | | 22 |
| 17 | 27.06071 | 2.5 | S-FPL51 | 19 |
| 18 | 53.58347 | 5.428608 | | 18 |
| STO | Infinity | 2.45164 | | 12.74 |
| 20 | −41.9031 | 1.5 | S-LAL18 | 13 |
| 21 | 18.64855 | 4 | CaF2 | 15 |
| 22 | −30.60567 | 0.1 | | 15 |
| 23 | 53.51228 | 3.8 | CaF2 | 16 |
| 24 | −42.7569 | 0.1 | | 16 |
| 25 | 33.31976 | 3 | SiO2 | 17.4 |
| 26 | 19.88882 | 41 | | 17.4 |
| IMA | Infinity | | | 43.26 |

TABLE 3b

Focusing Data for Example 3

| | | |
|---|---|---|
| OBMG | 0.000 | −0.153 |
| OBIM | Infinity | 300.000 |
| T0 | Infinity | 127.768 |
| T12 | 12.224 | 1.000 |
| T26 | 41.000 | 45.040 |

TABLE 4a

Prescription for Example 4

| Surf | Radius | Thickness | Glass | Diameter |
|---|---|---|---|---|
| OBJ | Infinity | Infinity | | |
| 1 | 55.29447 | 3.5 | S-FSL5 | 35.41 |
| 2 | 32.20471 | 11.23918 | | 32.88 |
| 3 | −34.59463 | 4 | PBL6Y | 32.37 |
| 4 | −40.65193 | 0.5 | | 33.41 |
| 5 | 36.04252 | 6.5 | S-FPL51Y | 32.57 |
| 6 | 550.9868 | 0.5 | | 31.45 |
| 7 | 26.16145 | 8 | S-FPL53 | 28.84 |
| 8 | −197.3263 | 2 | S-BAL42 | 26.70 |
| 9 | 18.51483 | 3 | PBL6Y | 23.37 |
| 10 | 22.09169 | 12.97123 | | 22.58 |
| STO | Infinity | 3.65354 | | 22.4 |
| 12 | 59.31478 | 2.5 | S-BAL42 | 22.8 |
| 13 | 30.26647 | 5 | S-FPL51Y | 22.8 |

TABLE 4a-continued

Prescription for Example 4

| Surf | Radius | Thickness | Glass | Diameter |
|---|---|---|---|---|
| 14 | −119.1318 | 8.276565 | | 22.8 |
| 15 | 176.7837 | 6 | S-FSL5 | 28.8 |
| 16 | −131.4428 | 18.35919 | | 28.8 |
| 17 | −68.81739 | 3 | S-FSL5 | 28.8 |
| 18 | 87.96358 | 41 | | 29.4 |
| IMA | Infinity | | | 43.26 |

TABLE 4b

Focusing Data for Example 4

| | | |
|---|---|---|
| OBMG | 0.0 | −0.500 |
| OBIM | Infinity | 459.398 |
| T0 | Infinity | 272.456 |
| T14 | 8.277 | 55.219 |
| T18 | 41.000 | 41.000 |

TABLE 5a

Prescription for Example 5

| Surf | Radius | Thickness | Glass | Diameter |
|---|---|---|---|---|
| OBJ | Infinity | Infinity | | |
| 1 | 133.2639 | 6 | S-FPL51Y | 65.86 |
| 2 | 212.7231 | 0.5 | | 65.10 |
| 3 | 83.91923 | 12 | S-FPL53 | 64.64 |
| 4 | −160.2629 | 3 | S-BAL42 | 63.89 |
| 5 | 82.88286 | 0.5 | | 60.91 |
| 6 | 49.43578 | 5 | S-FSL5 | 61.35 |
| 7 | 35.47566 | 15 | S-FPL53 | 57.31 |
| 8 | 135.3114 | 5 | PBL6Y | 56.02 |
| 9 | 423.3695 | 47.70628 | | 54.88 |
| 10 | −39.32989 | 3.5 | S-FPL51Y | 31.52 |
| 11 | −924.866 | 0.5 | | 31.30 |
| 12 | 86.41232 | 3.5 | PBL6Y | 31.16 |
| 13 | 57.81273 | 5 | | 30.47 |
| STO | Infinity | 10.40581 | | 30.55 |
| 15 | 143.1928 | 5 | S-BAL35 | 32.89 |
| 16 | −151.3162 | 139.0837 | | 33.10 |
| IMA | Infinity | Thickness | | 43.26 |

TABLE 5b

Focusing Data for Example 5

| | | | |
|---|---|---|---|
| OBMG | 0.0 | −0.031 | −0.090 |
| OBIM | Infinity | 10,271.011 | 4000.000 |
| T0 | Infinity | 10,000.000 | 3711.428 |
| T8 | 139.084 | 148.398 | 165.960 |

TABLE 6a

Prescription for Example 6

| Surf | Radius | Thickness | Glass | Diameter |
|---|---|---|---|---|
| OBJ | Infinity | Infinity | | |
| 1 | 333.6001 | 3 | S-LAL12 | 90.86449 |
| 2 | 144.5302 | 12 | CaF2 | 89.05565 |
| 3 | −236.2744 | 0.5 | | 88.91309 |
| 4 | 91.14198 | 4 | PBL6Y | 82.23098 |
| 5 | 72.33894 | 12 | CaF2 | 78.9124 |
| 6 | 930.8814 | 8 | PBL6Y | 78.33317 |
| 7 | −194.1441 | 3.5 | S-BAL42 | 76.68631 |
| 8 | 170.7135 | 6 | | 71.58794 |
| 9 | −124.9802 | 2 | CaF2 | 44.50628 |

TABLE 6a-continued

Prescription for Example 6

| Surf | Radius | Thickness | Glass | Diameter |
|---|---|---|---|---|
| 10 | 39.31421 | 6 | S-LAL18 | 41.04788 |
| 11 | 89.63887 | 4 | | 39.81123 |
| 12 | −142.2063 | 2 | CaF2 | 39.60752 |
| 13 | 27.12074 | 8 | SiO2 | 36.74409 |
| 14 | 60.38511 | 63.56121 | | 35.67945 |
| 15 | 269.5742 | 5 | CaF2 | 26.59853 |
| 16 | −51.08419 | 2 | S-BAL42 | 26.52383 |
| 17 | −104.8472 | 47.5379 | | 26.62047 |
| STO | Infinity | 1.5 | | 25.89484 |
| 19 | 53.09311 | 7 | CaF2 | 26.98941 |
| 20 | −49.55988 | 2 | S-LAL14 | 27.23041 |
| 21 | −154.4848 | 0.5 | | 27.7118 |
| 22 | 207.771 | 2 | S-LAL18 | 27.90874 |
| 23 | 54.66061 | 6 | CaF2 | 27.9616 |
| 24 | −2151.324 | 4 | PBL6Y | 28.48234 |
| 25 | −108.1674 | 70.12111 | | 28.85448 |
| 26 | −39.99955 | 2.5 | CaF2 | 31.66409 |
| 27 | 54.30652 | 6.5 | SiO2 | 34.12557 |
| 28 | −92.84692 | 40 | | 34.6928 |
| IMA | Infinity | | | 43.26 |

TABLE 6b

Zoom Configuration Data for Example 6

| EFL | 100 | 171 | 300 |
|---|---|---|---|
| T8 | 6.000 | 66.243 | 106.862 |
| T14 | 63.561 | 45.856 | 6.000 |
| T17 | 47.538 | 5.000 | 4.237 |

TABLE 7

Prescription for Example 7

| Surf | Radius | Thickness | Glass | Diameter |
|---|---|---|---|---|
| OBJ | Infinity | Infinity | | |
| 1 | 455.892 | 8 | S-FPL53 | 100.0517 |
| 2 | −1883.78 | 2 | | 99.71828 |
| STO | Infinity | 5 | S-BAL42 | 99.3975 |
| 4 | 257.5733 | 10 | CaF2 | 98.71527 |
| 5 | Infinity | 1 | | 98.51699 |

TABLE 7-continued

Prescription for Example 7

| Surf | Radius | Thickness | Glass | Diameter |
|---|---|---|---|---|
| 6 | 389.7448 | 7 | PBL6Y | 98.29418 |
| 7 | 537.9943 | 974.612 | | 97.54749 |
| IMA | Infinity | | | 8.781844 |

TABLE 8a

Prescription for Example 8

| Surf | Radius | Thickness | Glass | Diameter |
|---|---|---|---|---|
| OBJ | Infinity | 1059.082 | | 624.9179 |
| 1 | 19.81704 | 6.87149 | CaF2 | 27.2 |
| 2 | 25.92532 | 2.5 | S-BAL42 | 22.77078 |
| 3 | 16.72236 | 3.70837 | | 19.93378 |
| 4 | 27.57892 | 4.09211 | CaF2 | 19.1659 |
| 5 | 47.42948 | 3 | | 17.65579 |
| STO | Infinity | 3 | | 16.54433 |
| 7 | −49.10195 | 4.09211 | CaF2 | 17.21526 |
| 8 | −27.57892 | 3.70837 | | 18.52064 |
| 9 | −16.72236 | 2.5 | S-BAL42 | 19.14705 |
| 10 | −25.92532 | 6.87149 | CaF2 | 21.91247 |
| 11 | −19.86929 | 194.8068 | | 25.99021 |
| IMA | Infinity | | | 124.8957 |

TABLE 8b

Focusing Data for Example 8

| OBMG | 0.0 | −0.2 | −1.0 |
|---|---|---|---|
| OBIM | Infinity | 1294.233 | 717.734 |
| T0 | Infinity | 1059.082 | 339.199 |
| T11 | 158.952 | 194.807 | 338.191 |

TABLE 9

Refractive Indices for Glasses Used in the Examples

| | $N_{315}$ | $N_{365}$ | $N_{436}$ | $N_{480}$ | $N_{546}$ | $N_{656}$ | $N_{707}$ | $N_{1014}$ |
|---|---|---|---|---|---|---|---|---|
| CaF2 | 1.451336 | 1.444890 | 1.43945 | 1.437267 | 1.434931 | 1.432457 | 1.431658 | 1.428788 |
| S-FPL53 | 1.456325 | 1.449861 | 1.44441 | 1.442214 | 1.439856 | 1.437338 | 1.436514 | 1.433462 |
| S-FPL51 | 1.520463 | 1.511762 | 1.50449 | 1.501575 | 1.498457 | 1.495142 | 1.494063 | 1.490102 |
| S-FPL51Y | 1.520603 | 1.511855 | 1.50454 | 1.501604 | 1.498468 | 1.495139 | 1.494057 | 1.490106 |
| S-FSL5 | 1.513693 | 1.504065 | 1.49594 | 1.492671 | 1.489150 | 1.485351 | 1.484088 | 1.479149 |
| SiO2 | 1.483929 | 1.474556 | 1.46668 | 1.463505 | 1.460084 | 1.456378 | 1.455139 | 1.450243 |
| PBL6Y | 1.578381 | 1.559597 | 1.54537 | 1.539950 | 1.534305 | 1.528470 | 1.526609 | 1.519976 |
| S-BAL42 | 1.621738 | 1.607246 | 1.59527 | 1.590518 | 1.585472 | 1.580148 | 1.578422 | 1.572082 |
| S-BAL35 | 1.626845 | 1.612684 | 1.60101 | 1.596369 | 1.591432 | 1.586197 | 1.584489 | 1.578126 |
| S-LAL12 | 1.726866 | 1.708264 | 1.69311 | 1.687137 | 1.680825 | 1.674200 | 1.672065 | 1.664332 |
| S-LAL14 | 1.746488 | 1.727677 | 1.71231 | 1.706234 | 1.699794 | 1.692986 | 1.690771 | 1.682521 |
| S-LAL18 | 1.782060 | 1.762035 | 1.74566 | 1.739194 | 1.732342 | 1.725114 | 1.722768 | 1.714106 |

TABLE 10

Internal Transmission for Glasses Used in the Examples (10 mm Sample Thickness)

| | 310 nm | 320 nm | 350 nm | 400 nm |
|---|---|---|---|---|
| CaF2 | 0.999 | 0.999 | 0.999 | 0.999 |
| S-FPL53 | 0.51 | 0.71 | 0.967 | 0.996 |
| S-FPL51 | 0.37 | 0.60 | 0.947 | 0.995 |
| S-FPL51Y | 0.89 | 0.943 | 0.994 | 0.999 |
| S-FSL5 | 0.89 | 0.961 | 0.995 | 0.999 |
| SiO2 | 0.999 | 0.999 | 0.999 | 0.999 |

TABLE 10-continued

Internal Transmission for Glasses Used in
the Examples (10 mm Sample Thickness)

| | 310 nm | 320 nm | 350 nm | 400 nm |
|---|---|---|---|---|
| PBL6Y | 0.33 | 0.79 | 0.994 | 0.999 |
| S-BAL42 | 0.36 | 0.58 | 0.932 | 0.993 |
| S-BAL35 | 0.16 | 0.43 | 0.904 | 0.993 |
| S-LAL12 | 0.45 | 0.61 | 0.89 | 0.988 |
| S-LAL14 | 0.27 | 0.41 | 0.81 | 0.982 |
| S-LAL18 | 0.32 | 0.55 | 0.86 | 0.984 |

What is claimed is:

1. An optical system comprising:
three or more lens elements made of two or more different optical materials, wherein none of the optical materials has an internal transmission less than 10% at a wavelength of 310 nm when measured at a thickness of 10 mm, and wherein all lens elements are made from optical materials having an Abbe number higher than 40; and
wherein the optical system is well-corrected over a wavelength band that ranges from about 315 nm to about 1100 nm.

2. An optical system according to claim 1, in which at least one of the optical materials has an Abbe number greater than 71.

3. An optical system according to claim 1, in which all of the optical materials used have an index of refraction $n_d$ less than 1.8.

4. An optical system according to claim 1, in which at least one powered lens element is made from an optical material selected from the group comprising fused silica ($SiO_2$) and calcium fluoride ($CaF_2$) and in which at least one other powered lens element is made from an optical material that is neither $SiO_2$ nor $CaF_2$.

5. An optical system according to claim 1, wherein none of the lens elements are made from either $SiO_2$ or $CaF_2$.

6. An optical system according to claim 1, wherein the optical system defines a 60 mm focal length macro-focusing photographic objective having a 35 mm format.

7. An optical system according to claim 1, wherein the optical system defines a 35 mm focal length wide-angle photographic objective having a 35 mm format.

8. An optical system according to claim 1, wherein the optical system defines a 24 mm focal length wide-angle photographic objective having a 35 mm format.

9. An optical system according to claim 1, wherein the optical system defines a 105 mm focal length macro-focusing photographic objective having a 35 mm format.

10. An optical system according to claim 1, wherein the optical system defines a 300 mm focal length telephoto photographic objective having a 35 mm format.

11. An optical system according to claim 1, wherein the optical system defines a zoom photographic objective having a 35 mm format.

12. An optical system according to claim 1, wherein the optical system defines a 1000 mm zoom focal telescope objecting.

13. An optical system according to claim 1, wherein the optical system defines a photographic objecting having a 72 mm×96 mm digital scanning format.

* * * * *